United States Patent
Yokoi et al.

(10) Patent No.: US 10,138,149 B2
(45) Date of Patent: Nov. 27, 2018

(54) ULTRAPURE WATER PRODUCTION SYSTEM, ULTRAPURE WATER PRODUCTION FEED SYSTEM, AND METHOD FOR CLEANING THEREOF

(71) Applicant: KURITA WATER INDUSTRIES LTD., Tokyo (JP)

(72) Inventors: Ikunori Yokoi, Tokyo (JP); Takeo Fukui, Tokyo (JP); Yoichi Tanaka, Tokyo (JP)

(73) Assignee: KURITA WATER INDUSTRIES LTD., Tokyo (JP)

( * ) Notice: Subject to any disclaimer, the term of this patent is extended or adjusted under 35 U.S.C. 154(b) by 246 days.

(21) Appl. No.: 14/906,441

(22) PCT Filed: Jul. 22, 2014

(86) PCT No.: PCT/JP2014/069282
§ 371 (c)(1),
(2) Date: Jan. 20, 2016

(87) PCT Pub. No.: WO2015/012248
PCT Pub. Date: Jan. 29, 2015

(65) Prior Publication Data
US 2016/0159672 A1    Jun. 9, 2016

(30) Foreign Application Priority Data
Jul. 24, 2013  (JP) .................................. 2013-153640

(51) Int. Cl.
*B08B 9/027*  (2006.01)
*B08B 9/032*  (2006.01)
(Continued)

(52) U.S. Cl.
CPC .............. *C02F 9/00* (2013.01); *B01D 61/022* (2013.01); *B01D 61/142* (2013.01); *B01D 61/58* (2013.01);
(Continued)

(58) Field of Classification Search
CPC .... B01D 61/022; B01D 61/025; B01D 61/04; B01D 61/142; B01D 61/145;
(Continued)

(56) References Cited

U.S. PATENT DOCUMENTS 4,708,790 A * 11/1987 Bray ................... B01D 65/02
210/106
5,518,624 A *  5/1996 Filson .................. B01D 61/16
210/500.26
(Continued)

FOREIGN PATENT DOCUMENTS

| CN | 201423250 Y | 3/2010 |
| CN | 102527244 A | 7/2012 |

(Continued)

OTHER PUBLICATIONS

China Patent Office, "Office Action for Chinese Patent Application No. 201480033352.5," dated Nov. 15, 2016.
(Continued)

*Primary Examiner* — Joseph W Drodge
(74) *Attorney, Agent, or Firm* — Manabu Kanesaka

(57) ABSTRACT

Contaminants present inside an ultrapure water production system are prevented from being fed into a feed pipe connected to a water use point and, after sterilization cleaning, the system is prevented from being contaminated by contaminants captured on a microparticle removal membrane during sterilization cleaning. Ultrapure water having high quality is thereby fed to a water use point within a short period of time. An ultrapure water production system is
(Continued)

provided with a tank, a pump, a heat exchanger, an ultraviolet device, an ion-exchange device, a first microparticle removal membrane device, and a second microparticle removal membrane device. Parts of sterilization water and flush water are fed into the first microparticle removal membrane device and discharged from a feedwater-side potion to a concentrated-water-side portion without permeating through a microparticle removal membrane thereof, and the remaining part of the water is passed through the second microparticle removal membrane device.

12 Claims, 19 Drawing Sheets

(51) Int. Cl.
| | | |
|---|---|---|
| *B01D 61/14* | (2006.01) | |
| *B01D 61/58* | (2006.01) | |
| *B01D 65/02* | (2006.01) | |
| *C02F 1/44* | (2006.01) | |
| *C02F 1/42* | (2006.01) | |
| *C02F 1/32* | (2006.01) | |
| *C02F 9/00* | (2006.01) | |
| *B08B 3/14* | (2006.01) | |
| *B01D 61/02* | (2006.01) | |
| *C02F 1/20* | (2006.01) | |
| *C02F 103/04* | (2006.01) | |

(52) U.S. Cl.
CPC ........... *B01D 65/02* (2013.01); *B08B 3/14* (2013.01); *B08B 9/027* (2013.01); *B08B 9/032* (2013.01); *C02F 1/444* (2013.01); *B01D 61/025* (2013.01); *B01D 61/145* (2013.01); *B01D 61/147* (2013.01); *B01D 2311/2623* (2013.01); *B01D 2311/2692* (2013.01); *B01D 2317/04* (2013.01); *C02F 1/20* (2013.01); *C02F 1/32* (2013.01); *C02F 1/325* (2013.01); *C02F 1/42* (2013.01); *C02F 1/441* (2013.01); *C02F 2103/04* (2013.01); *C02F 2301/043* (2013.01); *C02F 2303/04* (2013.01); *C02F 2303/16* (2013.01)

(58) Field of Classification Search
CPC ...... B01D 61/147; B01D 61/16; B01D 61/58; B01D 65/02; B01D 65/022; B01D 65/08; B01D 2311/02; B01D 2311/04; B01D 2311/2619; B01D 2311/2623; B01D 2311/2692; B01D 2317/04; B08B 3/14; B08B 9/027; B08B 9/0856; B08B 9/02; B08B 9/032; C02F 1/20; C02F 1/32; C02F 1/42; C02F 1/44; C02F 1/441; C02F 1/444; C02F 1/325; C02F 9/00; C02F 2001/422; C02F 2001/425; C02F 2001/427; C02F 2103/04; C02F 2301/043; C02F 2303/04; C02F 2303/16
USPC .... 210/182, 184, 192, 195.2, 263, 259, 258, 210/321.6, 321.69, 636, 641, 650, 663, 210/669, 774, 806, 900; 134/22.11, 134/22.12, 22.18
See application file for complete search history.

(56) References Cited

U.S. PATENT DOCUMENTS

| | | | | |
|---|---|---|---|---|
| 6,328,896 | B1* | 12/2001 | Atnoor | C02F 1/42 204/158.2 |
| 8,318,021 | B2* | 11/2012 | Armour | H04N 7/0115 210/321.69 |
| 2003/0127388 | A1* | 7/2003 | Ando | B01D 61/04 210/636 |
| 2005/0067341 | A1* | 3/2005 | Green | B01D 61/022 210/321.69 |
| 2010/0032387 | A1* | 2/2010 | Yokoi | A61L 2/183 210/797 |
| 2010/0044311 | A1* | 2/2010 | Kobayashi | B01D 61/16 210/638 |
| 2013/0313191 | A1* | 11/2013 | Wolf | C02F 9/00 210/638 |

FOREIGN PATENT DOCUMENTS

| | | |
|---|---|---|
| JP | S62-014986 A | 1/1987 |
| JP | 2000-317413 A | 11/2000 |
| JP | 2002-166283 A | 6/2002 |
| JP | 2004-122020 A | 4/2004 |
| JP | 2004-275881 A | 10/2004 |
| JP | 2005-224656 A | 8/2005 |
| JP | 2011-161418 A | 8/2011 |

OTHER PUBLICATIONS

PCT/ISA/210, "International Search Report for International Application No. PCT/JP2014/069282."

* cited by examiner

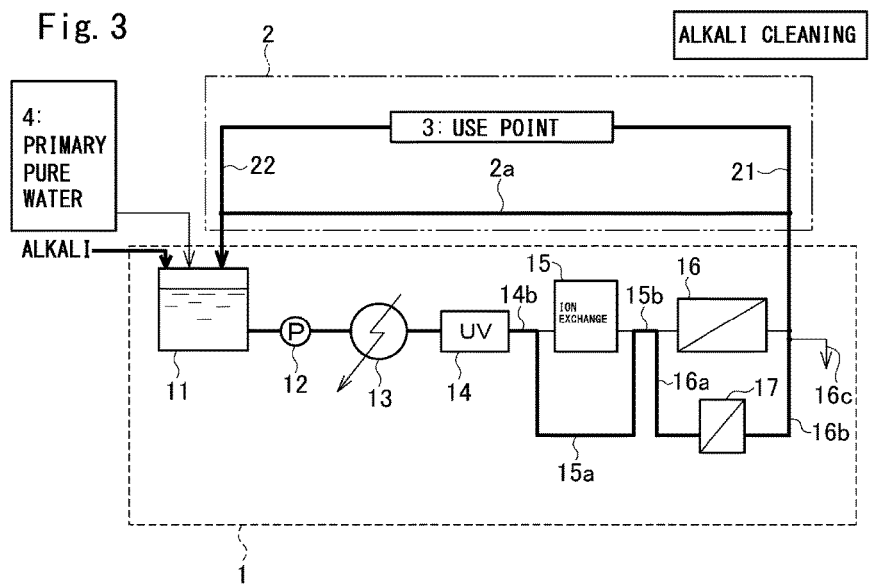
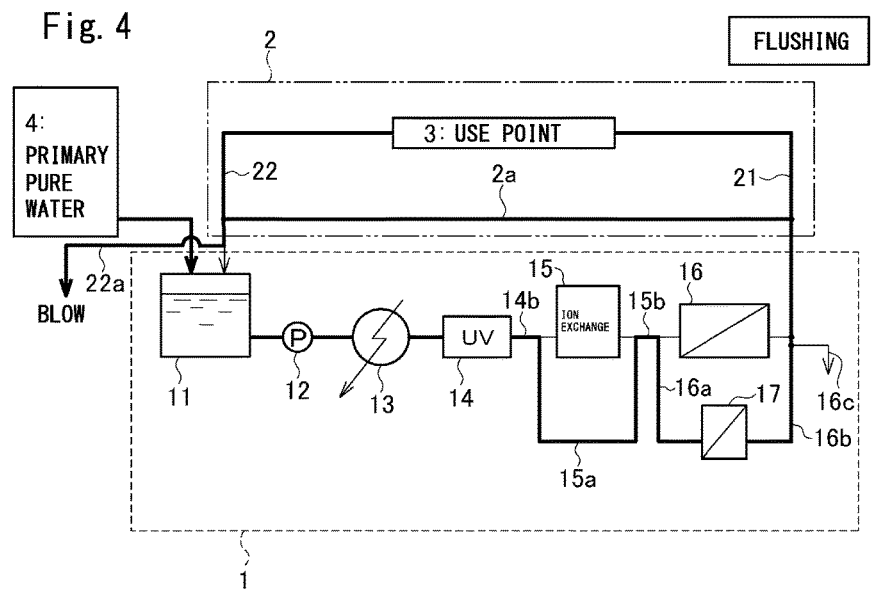

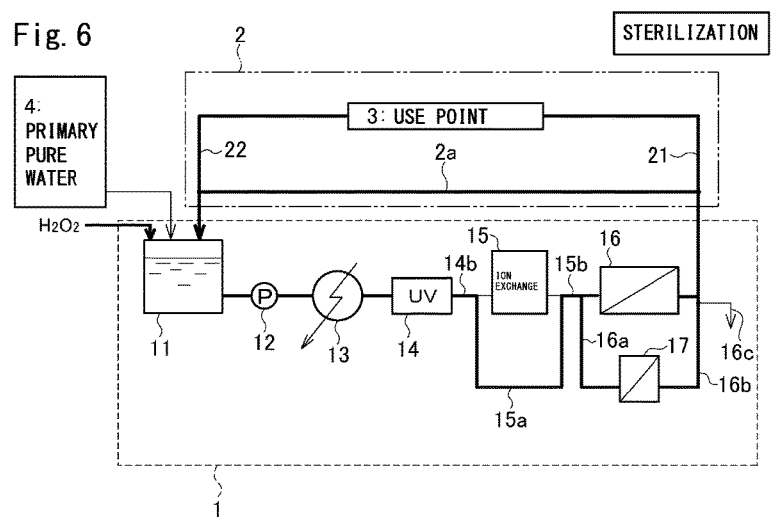
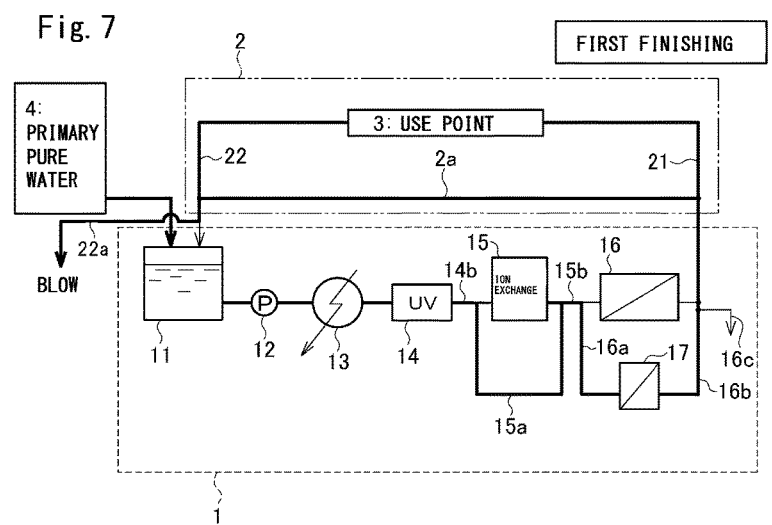

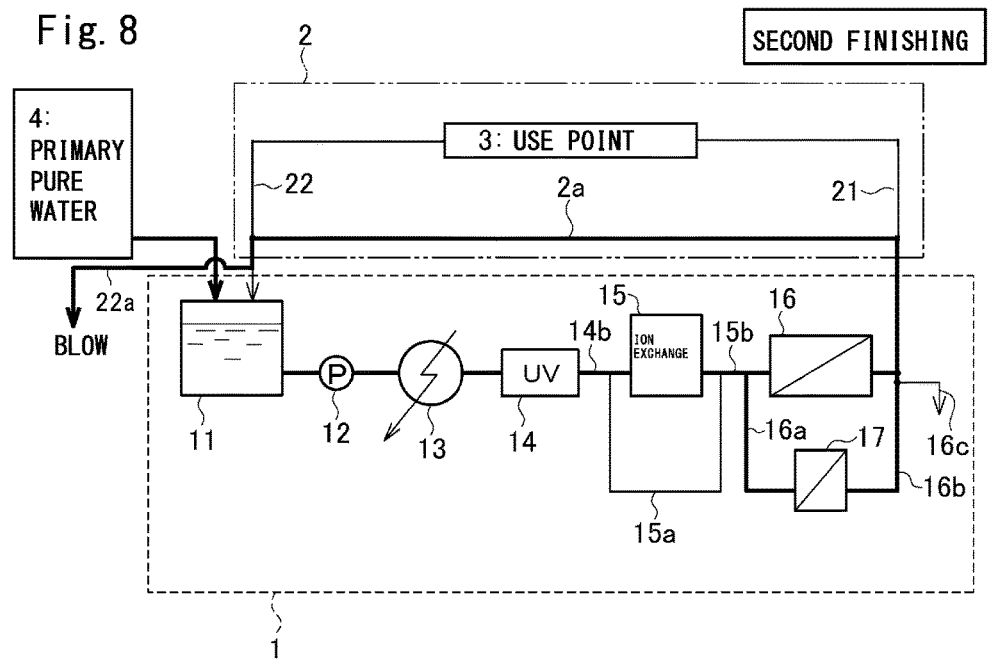
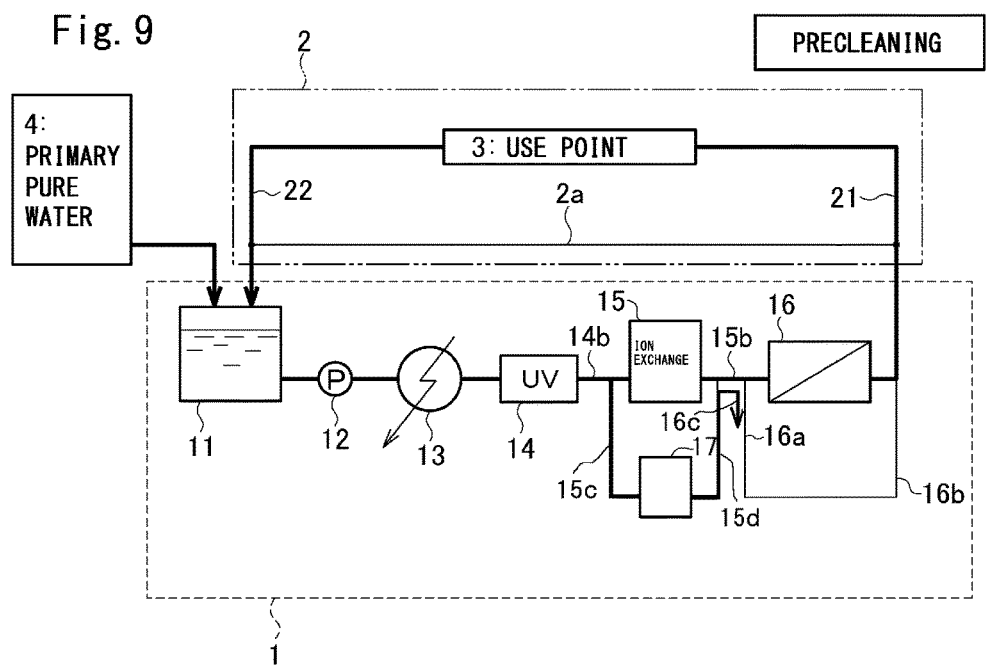

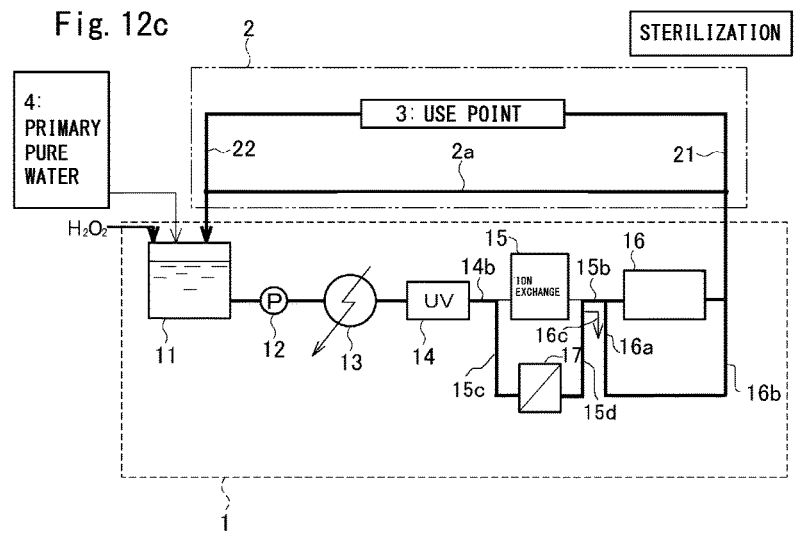
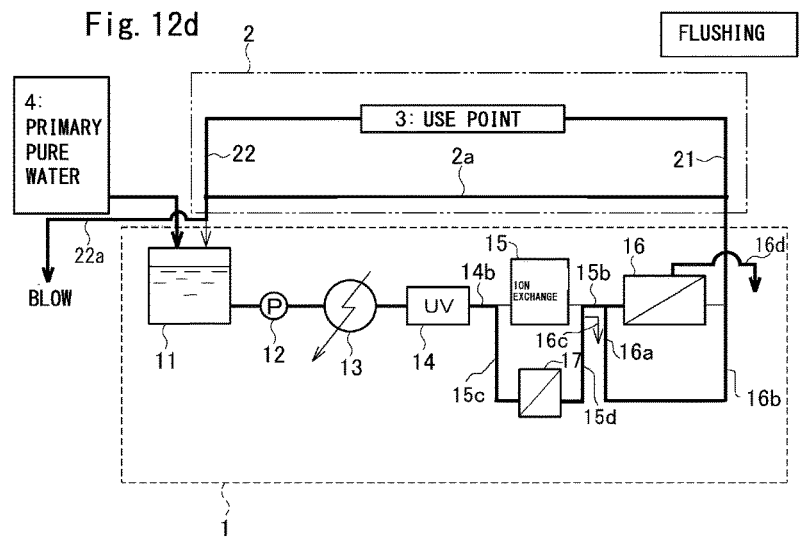

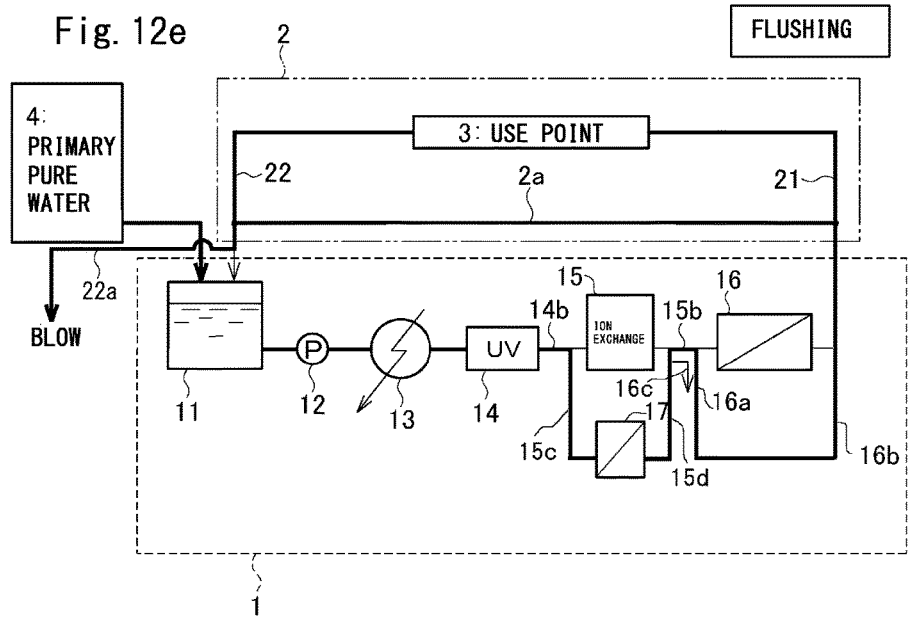
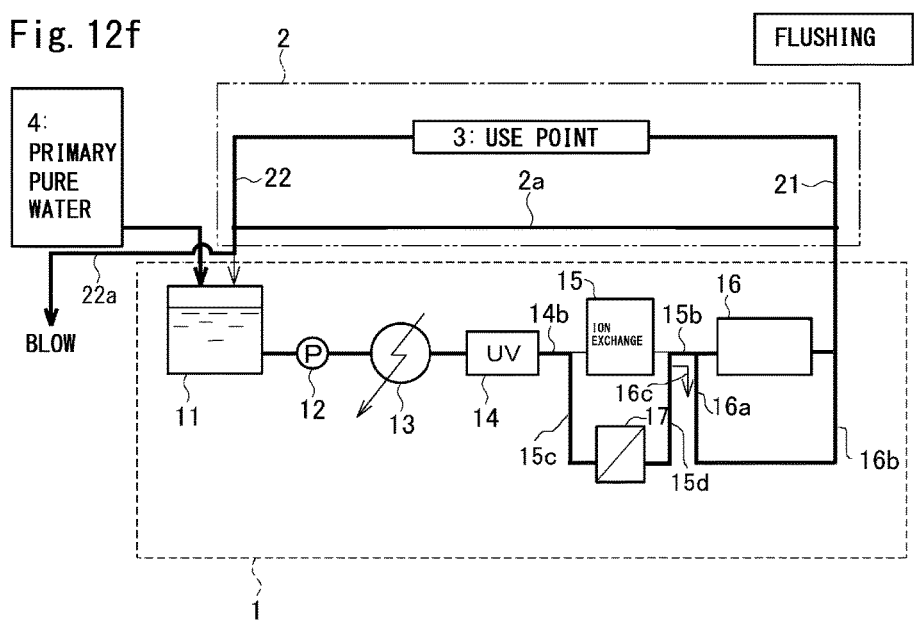

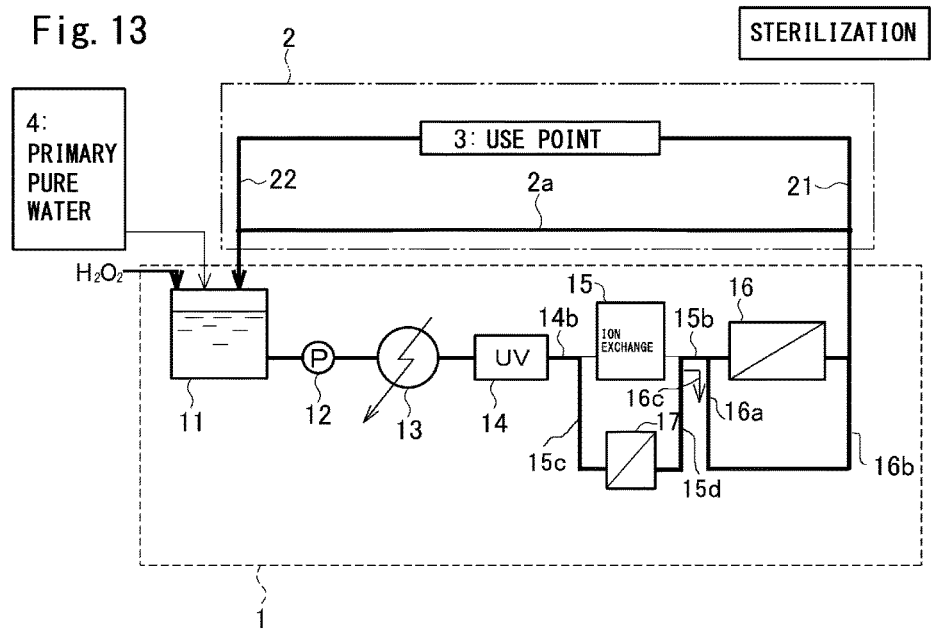
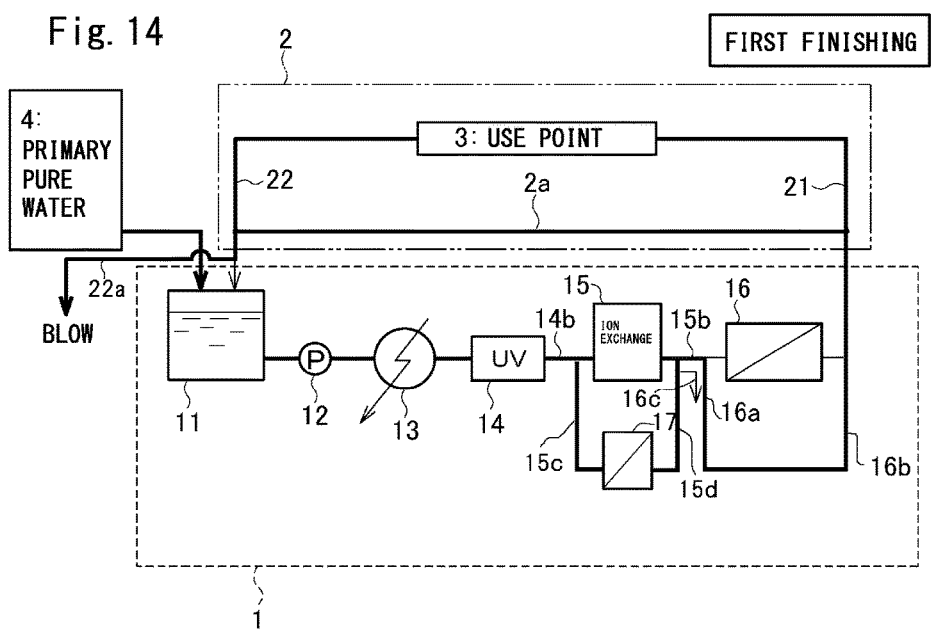

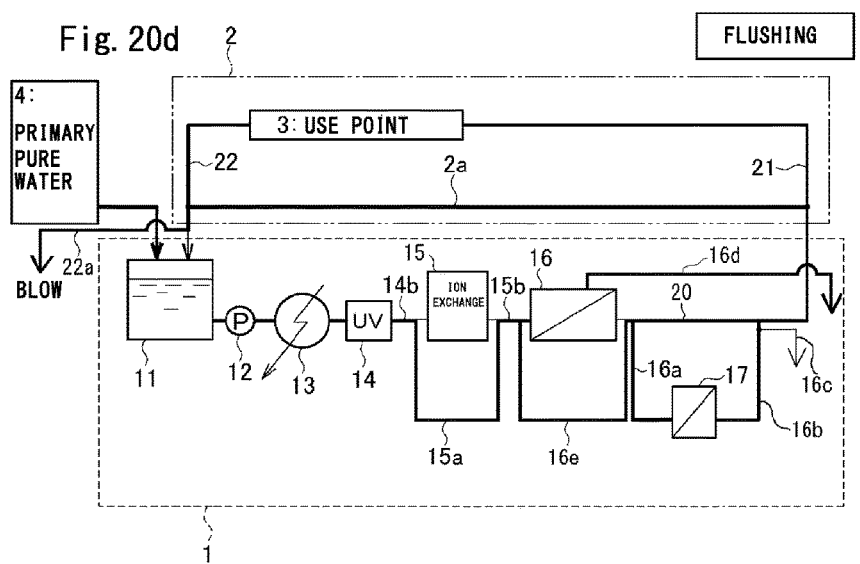
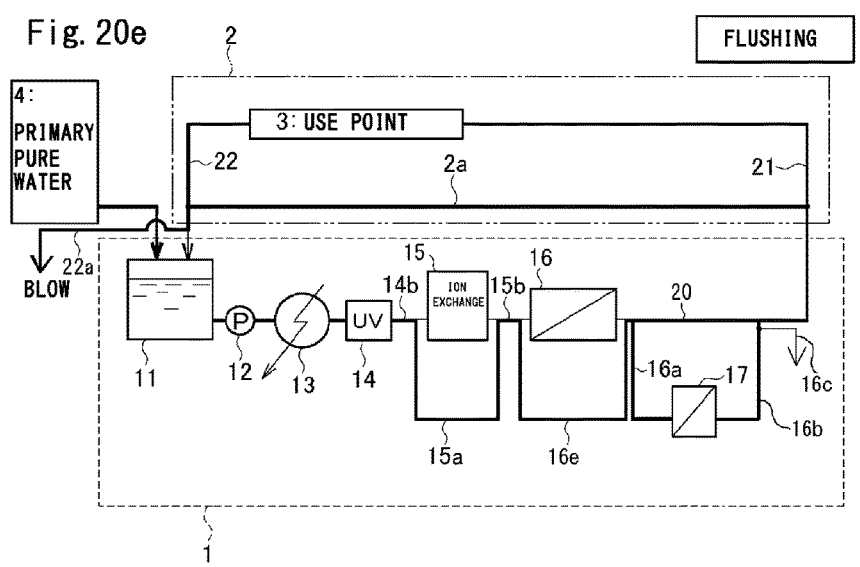

ULTRAPURE WATER PRODUCTION SYSTEM, ULTRAPURE WATER PRODUCTION FEED SYSTEM, AND METHOD FOR CLEANING THEREOF

FIELD OF THE INVENTION

The present invention relates to an ultrapure water production system, an ultrapure water production feed system, a method for cleaning the ultrapure water production system, and a method for cleaning the ultrapure water production feed system. Specifically, the present invention relates to an ultrapure water production system, a method for cleaning the ultrapure water production system, an ultrapure water production feed system, and a method for cleaning the ultrapure water production feed system that enable ultrapure water having high quality to be fed to a water use point (use point) within a short period of time after a sterilization cleaning step has been conducted.

BACKGROUND OF THE INVENTION

Ultrapure water has been used as wash water for cleaning members in the field of electronic industry. The quality of ultrapure water used in semiconductor manufacturing plants and wafer manufacturing plants is strictly controlled. For example, resistivity (specific resistance): 18.2 MΩ·cm or higher, microparticles: the number of microparticles having a diameter of 50 nm or more is 100 or less and the number of microparticles having a diameter of 20 nm or more is 1,000 or less, microorganisms: 1 count/L or less, TOC (total organic carbon): 0.5 μg/L or less, total silicon: 0.05 μg/L or less, metals: 0.1 ng/L or less, and ions: 5 ng/L or less are required.

The following microparticles may remain inside an ultrapure water production system: microparticles such as dust contained in the air, silica microparticles, and aluminium microparticles that may enter the system during the construction (new construction, extension, or modification) or the maintenance of the ultrapure water production system; particles contained in water, such as remains of dead bacteria and iron rust; and microparticles derived from shavings of membranes, pipes, and the like which may be produced in the production process. There has been proposed a method in which cleaning is performed using an alkaline solution in order to discharge such microparticles to the outside of the system and reduce the content of microparticles having a diameter of 50 nm or more in ultrapure water to 1000 particle/L or less (Patent Literature 1).

Patent Literatures 2 and 3 describe a method for sterilizing an ultrapure water production system which enables the content of microorganisms in ultrapure water to be reduced.

LIST OF LITERATURE

Patent Literature

Patent Literature 1: Japanese Patent Publication 2000-317413 A
Patent Literature 2: Japanese Patent Publication 2002-166283 A
Patent Literature 3: Japanese Patent Publication 2004-275881 A

OBJECT AND SUMMARY OF THE INVENTION

Object of the Invention

The above-described sterilization cleaning methods of the related art have the following problems.

i) When sterilization cleaning is performed, waste particles (contaminants) present inside an ultrapure water production system are captured on a microparticle removal membrane included in the ultrapure water production system. The captured contaminants come off the surface of the membrane and mix with water, which causes secondary pollution that lasts for a prolonged period of time. Thus, it may become impossible to feed ultrapure water having high quality to a water use point within a short period of time after sterilization cleaning has been performed.

ii) If sterilization cleaning is performed without the microparticle removal membrane in order to avoid the above problem from occurring, contaminants present inside the ultrapure water production system may be fed into a feed pipe through which ultrapure water is fed to the water use point. As a result, again, it may become impossible to feed ultrapure water having high quality to a water use point within a short period of time after sterilization cleaning has been performed.

The present invention addresses the above-described problems of the related art. An object of the present invention is to provide an ultrapure water production system, a method for producing the ultrapure water production system, an ultrapure water production feed system, and a method for cleaning the ultrapure water production feed system that reduce, while sterilization cleaning is performed, the risk of contaminants present inside the ultrapure water production system being fed into a feed pipe connected to a water use point and, after sterilization cleaning has been performed, the risk of system being contaminated by contaminants captured on the microparticle removal membrane and thereby enable ultrapure water having high quality to be fed to a water use point (use point) within a short period of time.

SUMMARY OF THE INVENTION

The Inventors conducted investigation for solving problems described above, and obtained findings that the problems are solved by the below method. In the method, a second microparticle removal membrane device being different from a first microparticle removal membrane device is disposed in an ultrapure water production system. When the system is subjected to sterilization cleaning and flushing cleaning after the sterilization cleaning, sterilization water and flush water is fed into the second microparticle removal membrane device. For the first microparticle removal membrane device, wash water is used for cleaning only the feedwater-side portion of the first microparticle removal membrane device without permeating through the membrane thereof; or wash water is not passed into the first microparticle removal membrane device, and the membrane of the first microparticle removal membrane device is replaced with a sterilized microparticle removal membrane.

The present invention was accomplished based on the above findings, and the gist thereof is as below:

[1] A method for cleaning an ultrapure water production system including a tank, a pump, a heat exchanger, an ultraviolet device, an ion-exchange device, and a first microparticle removal membrane device, the method comprising a step in which sterilization water is passed through the ultrapure water production system in order to perform sterilization cleaning of the ultrapure water production system and a step in which flush water is passed through the ultrapure water production system in order to perform flushing cleaning of the ultrapure water production system subsequent to sterilization cleaning, wherein a second microparticle removal membrane device is disposed parallel to the first microparticle removal membrane device, and wherein any one of cleaning steps described in (I-1) to (I-3) below is conducted and, subsequent to the cleaning step, water is not passed through the second microparticle removal membrane device, but is passed through the heat exchanger, the ultraviolet device, the ion-exchange device, and the first microparticle removal membrane device in order to produce ultrapure water, (I-1) part of the sterilization water or the flush water is fed into the first microparticle removal membrane device and discharged from a feedwater-side potion of the first microparticle removal membrane device to a concentrated-water-side portion of the first microparticle removal membrane device without permeating through a microparticle removal membrane included in the first microparticle removal membrane device, and the remaining part of the sterilization water or the flush water is passed through the second microparticle removal membrane device, (I-2) the whole amount of sterilization water or flush water is passed through the second microparticle removal membrane device, and the microparticle removal membrane of the first microparticle removal membrane device is replaced with a sterilized microparticle removal membrane, and (I-3) after the microparticle removal membrane of the first microparticle removal membrane device is replaced with a pipe, part of the sterilization water or the flush water is passed through the first microparticle removal membrane device, the remaining part of the sterilization water or the flush water is passed through the second microparticle removal membrane device, and the pipe of the first microparticle removal membrane device is subsequently replaced with a sterilized microparticle removal membrane.

[2] A method for cleaning an ultrapure water production system including a tank, a pump, a heat exchanger, an ultraviolet device, an ion-exchange device, and a first microparticle removal membrane device, the method comprising a step in which sterilization water is passed through the ultrapure water production system in order to perform sterilization cleaning of the ultrapure water production system and a step in which flush water is passed through the ultrapure water production system in order to perform flushing cleaning of the ultrapure water production system subsequent to sterilization cleaning, wherein a second microparticle removal membrane device is interposed between a final pump of the ultrapure water production system and the first microparticle removal membrane device such that water can be diverted from the second microparticle removal membrane device, and wherein any one of cleaning steps described in (II-1) to (II-3) below is conducted and, subsequent to the cleaning step, the second microparticle removal membrane device is bypassed, and water is passed through the heat exchanger, the ultraviolet device, the ion-exchange device, and the first microparticle removal membrane device in order to produce ultrapure water, (II-1) after a bypass pipe has been disposed such that the first microparticle removal membrane device is bypassed, the sterilization water or the flush water is passed through the second microparticle removal membrane device, part of water that permeated through the second microparticle removal membrane device is fed into the first microparticle removal membrane device and discharged from a feedwater-side portion of the first microparticle removal membrane device to a concentrated-water-side portion of the first microparticle removal membrane device without permeating through a microparticle removal membrane included in the first microparticle removal membrane device, and the remaining part of the water passed through the second microparticle removal membrane device is passed through the bypass pipe, (II-2) after a bypass pipe has been disposed such that the first microparticle removal membrane device is bypassed, the sterilization water or the flush water is passed through the second microparticle removal membrane device and the bypass pipe, and the microparticle removal membrane of the first microparticle removal membrane device is replaced with a sterilized microparticle removal membrane, and (II-3) after the microparticle removal membrane of the first microparticle removal membrane device has been replaced with a pipe, the sterilization water or the flush water is passed through the second microparticle removal membrane device and the first microparticle removal membrane device, and the pipe of the first microparticle removal membrane device is subsequently replaced with a sterilized microparticle removal membrane.

[3] A method for cleaning an ultrapure water production system including a tank, a pump, a heat exchanger, an ultraviolet device, an ion-exchange device, and a first microparticle removal membrane device, the method comprising a step in which sterilization water is passed through the ultrapure water production system in order to perform sterilization cleaning of the ultrapure water production system and a step in which flush water is passed through the ultrapure water production system in order to perform flushing cleaning of the ultrapure water production system subsequent to sterilization cleaning, wherein a second microparticle removal membrane device is disposed downstream of the first microparticle removal membrane device such that water can be diverted from the second microparticle removal membrane device, and wherein any one of cleaning steps described in (III-1) to (III-3) below is conducted and, subsequent to the cleaning step, the second microparticle removal membrane device is bypassed, and water is passed through the heat exchanger, the ultraviolet device, the ion-exchange device, and the first microparticle removal membrane device in order to produce ultrapure water, (III-1) after a bypass has been disposed such that the first microparticle removal membrane device is bypassed, part of the sterilization water or the flush water is fed into the first microparticle removal membrane device and discharged from a feedwater-side portion of the first microparticle removal membrane device to a concentrated-water-side portion of the first microparticle removal membrane device without permeating a microparticle removal membrane included in the first microparticle removal membrane device, and the remaining part of the sterilization water or the flush water is passed through the bypass pipe and subsequently passed through the second microparticle removal membrane device, (III-2) after a bypass pipe has been disposed such that the first microparticle removal membrane device is bypassed, the sterilization water or the flush water is passed through the bypass pipe and the second microparticle removal membrane device, and the microparticle removal membrane of the first microparticle removal membrane device is replaced with a sterilized microparticle removal membrane, and (III-3) after the microparticle removal membrane of the first microparticle removal membrane device has been replaced with a pipe, the sterilization water or the flush water is passed through the first and second microparticle removal membrane devices, and the pipe of the first microparticle removal membrane device is subsequently replaced with a sterilized microparticle removal membrane.

[4] The method for cleaning an ultrapure water production system according to any one of [1] to [3], wherein the sterilized microparticle removal membrane is prepared by performing sterilization cleaning with one or more types of sterilization water selected from oxidizer-containing water, an organic solution, and hot water and subsequently replacing the sterilization water contained in the microparticle removal membrane with ultrapure water before the microparticle removal membrane is attached to the ultrapure water production system.

[5] The method for cleaning an ultrapure water production system according to [4], wherein the microparticle removal membrane is attached to the ultrapure water production system within 6 months after the sterilization water contained in the microparticle removal membrane has been replaced with ultrapure water.

[6] The method for cleaning an ultrapure water production system according to any one of [1] to [5], wherein sterilization cleaning and flushing cleaning are performed using alkali cleaning and/or acid cleaning in combination.

[7] A method for cleaning an ultrapure water production feed system including an ultrapure water production system including a tank, a pump, a heat exchanger, an ultraviolet device, an ion-exchange device, and a first microparticle removal membrane device; a feed pipe through which ultrapure water produced in the ultrapure water production system is fed to a water use point; and a return pipe through which excess water passed from the water use point is returned to the ultrapure water production system, the method comprising a step in which sterilization water is passed through the ultrapure water production feed system in order to perform sterilization cleaning of the ultrapure water production feed system and a step in which flush water is passed through the ultrapure water production feed system in order to perform flushing cleaning of the ultrapure water production feed system subsequent to sterilization cleaning, wherein the ultrapure water production system is cleaned by the method for cleaning an ultrapure water production system according to any one of [1] to [6], and wherein, in the cleaning step, the sterilization water or the flush water that permeated through the second microparticle removal membrane device is passed through the feed pipe and the return pipe and subsequently discharged to the outside of the system.

Advantageous Effects of Invention

According to the present invention, during sterilization cleaning and flushing cleaning subsequent to sterilization cleaning, wash water is used for cleaning only the feedwater-side portion of the first microparticle removal membrane device and subsequently discharged to the outside of the system without permeating through the membrane of a first microparticle removal membrane device, which is originally disposed in an ultrapure water production system. In another case, wash water is not passed into the first microparticle removal membrane device, and the membrane of the first microparticle removal membrane device is replaced with a sterilized microparticle removal membrane. This addresses the problem described in i) above that contaminants that have come off the first microparticle removal membrane device contaminate the inside of the system.

During sterilization cleaning and flushing cleaning subsequent to sterilization cleaning, sterilization water or flush water is passed through a second microparticle removal membrane device, and water that permeated through the second microparticle removal membrane device is fed into a feed pipe connected to a water use point. Therefore, there is no risk of the contaminants being fed into the feed pipe. Thus, the problem described in ii) above may also be addressed.

The cleaning methods according to the present invention enable ultrapure water having high quality to be fed to a water use point within a short period of time after sterilization cleaning has been performed.

BRIEF DESCRIPTION OF THE DRAWINGS

FIG. 3 is a block diagram of an ultrapure water production system and an ultrapure water production feed system according to a first embodiment.

FIG. 4 is a block diagram of an ultrapure water production system and an ultrapure water production feed system according to a first embodiment.

FIG. 6 is a block diagram of an ultrapure water production system and an ultrapure water production feed system according to a first embodiment.

FIG. 7 is a block diagram of an ultrapure water production system and an ultrapure water production feed system according to a first embodiment.

FIG. 8 is a block diagram of an ultrapure water production system and an ultrapure water production feed system according to a first embodiment.

FIG. 9 is a block diagram of an ultrapure water production system and an ultrapure water production feed system according to a second embodiment.

FIG. 12c is a block diagram of an ultrapure water production system and an ultrapure water production feed system according to a second embodiment.

FIG. 12d is a block diagram of an ultrapure water production system and an ultrapure water production feed system according to a second embodiment.

FIG. 12e is a block diagram of an ultrapure water production system and an ultrapure water production feed system according to a second embodiment.

FIG. 12f is a block diagram of an ultrapure water production system and an ultrapure water production feed system according to a second embodiment.

FIG. 13 is a block diagram of an ultrapure water production system and an ultrapure water production feed system according to a second embodiment.

FIG. 14 is a block diagram of an ultrapure water production system and an ultrapure water production feed system according to a second embodiment.

FIG. 20d is a block diagram of an ultrapure water production system and an ultrapure water production feed system according to a third embodiment.

FIG. 20e is a block diagram of an ultrapure water production system and an ultrapure water production feed system according to a third embodiment.

DESCRIPTION OF EMBODIMENTS

The present invention is described more specifically with reference to the attached drawings.

The terms "pure water" and "ultrapure water" used herein refer to types of water having the following qualities, respectively.

Primary pure water: Resistivity: 10 MΩ·cm or higher TOC: 100 μg/L or less

Ultrapure water: Resistivity: 15 MΩ·cm or higher TOC: 1 μg/L or less Metals: 1 ng/L or less

[First Embodiment]

Figure 1:
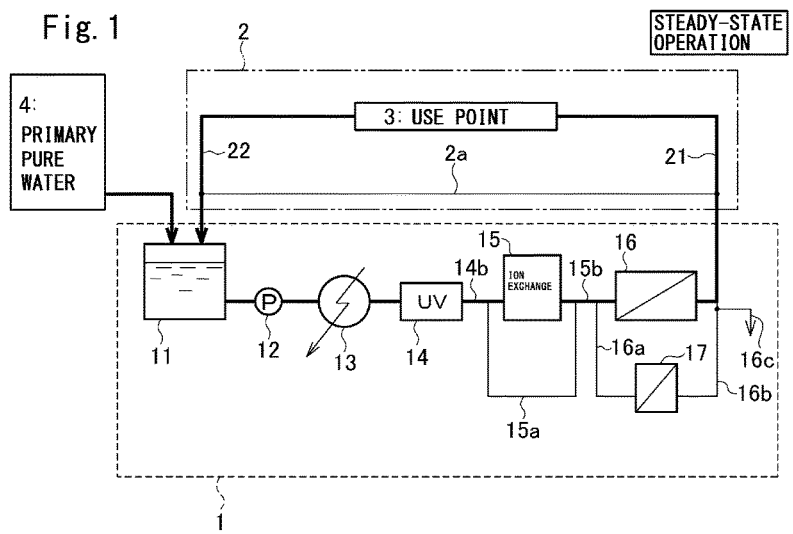
FIG. 1 is a block diagram of an ultrapure water production system and an ultrapure water production feed system according to a first embodiment.

FIG. 1 is a block diagram of an ultrapure water production system and an ultrapure water feed pipe system for explaining a method for cleaning an ultrapure water production system and an ultrapure water production feed system according to the first embodiment of the present invention.

An ultrapure water production system 1 includes a tank 11, a pump 12, a heat exchanger 13, an ultraviolet device (ultraviolet oxidation device) 14, an ion-exchange device 15, and a first microparticle removal membrane device 16. These devices are connected to one another with pipes or tubes. Optionally, a membrane separation device including a reverse osmosis (RO) membrane, a deaeration device, an oxidizer removal device, a pump other than the pump 12, and an ion-exchange device different from or the same as the ion-exchange device 15 may be interposed between the pump 12 and the first microparticle removal membrane device 16. The ultraviolet device 14 is selected from a low-pressure ultraviolet oxidation device and an ultraviolet sterilization device depending on the quality required for the ultrapure water. The microparticle removal membrane device is selected from an ultrafiltration membrane device (UF), a microfiltration membrane device (MF), and a reverse osmosis membrane device (RO) depending on the quality required for the ultrapure water and sterilization conditions.

In this embodiment, a bypass pipe 15a that serves as a shortcut between an outlet pipe 14b of the ultraviolet device 14 and an outlet pipe 15b of the ion-exchange device 15 is disposed such that the ion-exchange device 15 is bypassed. Although the illustration is omitted, the bypass pipes may also be disposed such that the heat exchanger 13 and the ultraviolet device 14 are bypassed.

A bypass pipe 16a, a second microparticle removal membrane device 17, and a bypass pipe 16b are disposed such that the first microparticle removal membrane device 16 is bypassed. A first blow pipe 16c is connected to the bypass pipe 16b at the lowest reach of the bypass pipe 16b.

The ultrapure water feed pipe system 2 includes a point (use point) 3 at which ultrapure water is used and channels (pipes or tubes) 21 and 22 through which ultrapure water flows. A second blow pipe 22a (FIGS. 4, 5d to 5f, 7, and 8) is disposed at the end of the channel 22.

A bypass pipe 2a, with which the pipes 21 and 22 are connected to each other, is disposed such that the water use point 3 is bypassed. Although the illustration is omitted, a channel-switching valve is disposed at a portion of each pipe or tube at which the pipe or tube is branched or merges with another pipe or tube.

During the steady-state operation, primary pure water 4 and ultrapure water returned through the ultrapure water feed pipe 22 are received in the tank 11 as illustrated in FIG. 1. Water (raw water of ultrapure water) contained in the tank 11 is conveyed using the pump 12 and treated in the heat exchanger 13, the ultraviolet device 14, the ion-exchange device 15, and the first microparticle removal membrane device 16 successively. Thus, ultrapure water is produced.

The primary pure water can be prepared by, for example, subjecting pretreated raw water to a reverse osmosis (RO) membrane device, treating the permeate water using an ion-exchange device, and subsequently performing a reverse osmosis membrane treatment. The primary pure water may also be prepared by subjecting pretreated raw water to a multibed column ion-exchange device, a reverse osmosis (RO) membrane device, an ultraviolet device, an ion-exchange device, and a deaeration device successively.

Ultrapure water produced in the ultrapure water production system 1 is fed to the water use point 3 through the channel 21. Part of the ultrapure water is used at the water use point 3, and the unused part of the ultrapure water is returned to the ultrapure water production system 1 through the channel 22.

[Example Cleaning Process]

Figure 2:
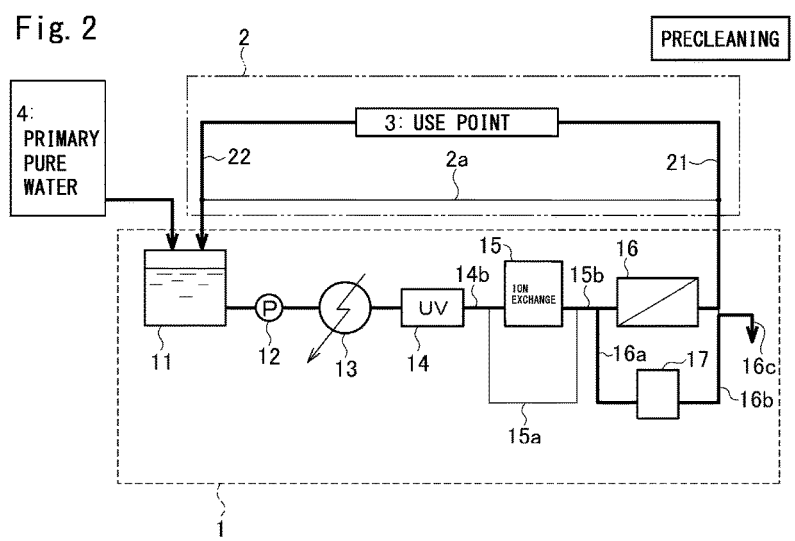
FIG. 2 is a block diagram of an ultrapure water production system and an ultrapure water production feed system according to a first embodiment.
Figure 5A:
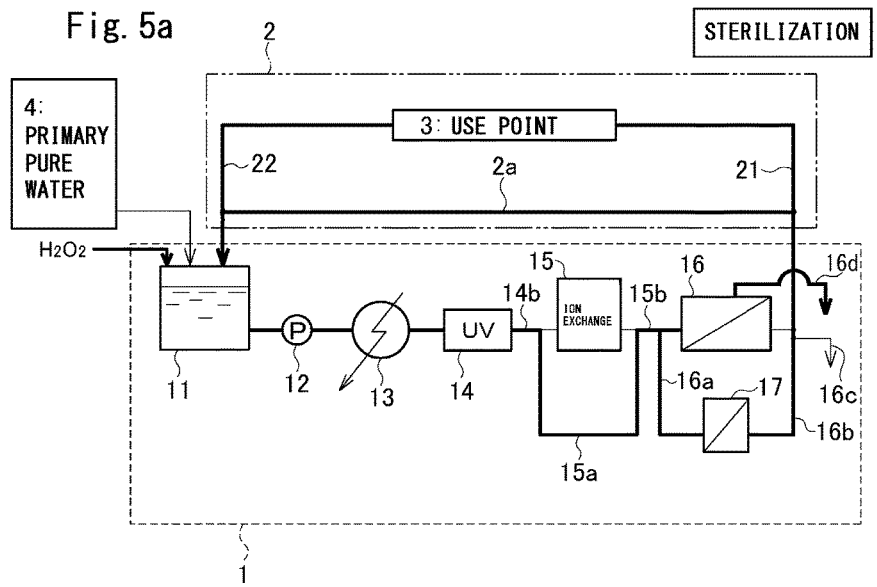
FIG. 5a is a block diagram of an ultrapure water production system and an ultrapure water production feed system according to a first embodiment.
Figure 5B:
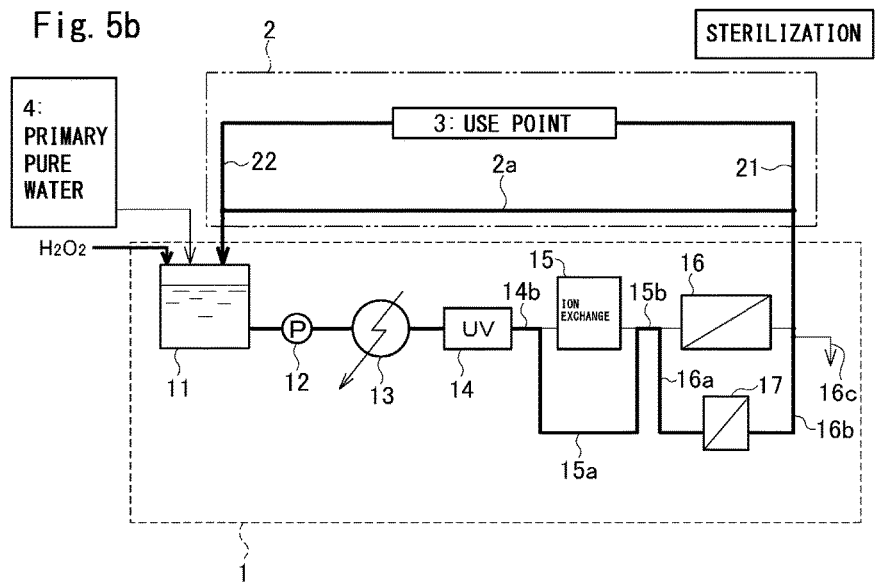
FIG. 5b is a block diagram of an ultrapure water production system and an ultrapure water production feed system according to a first embodiment.
Figure 5C:
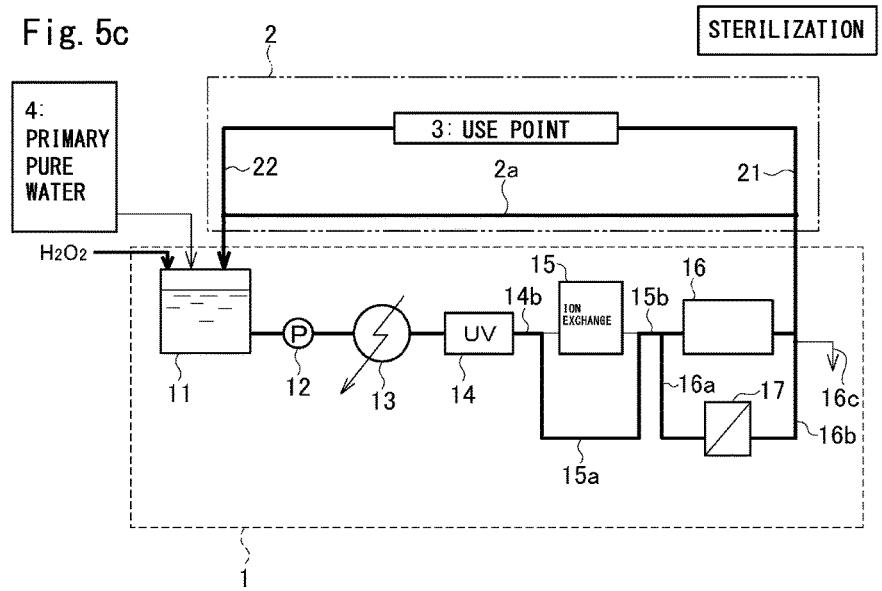
FIG. 5c is a block diagram of an ultrapure water production system and an ultrapure water production feed system according to a first embodiment.
Figure 5D:
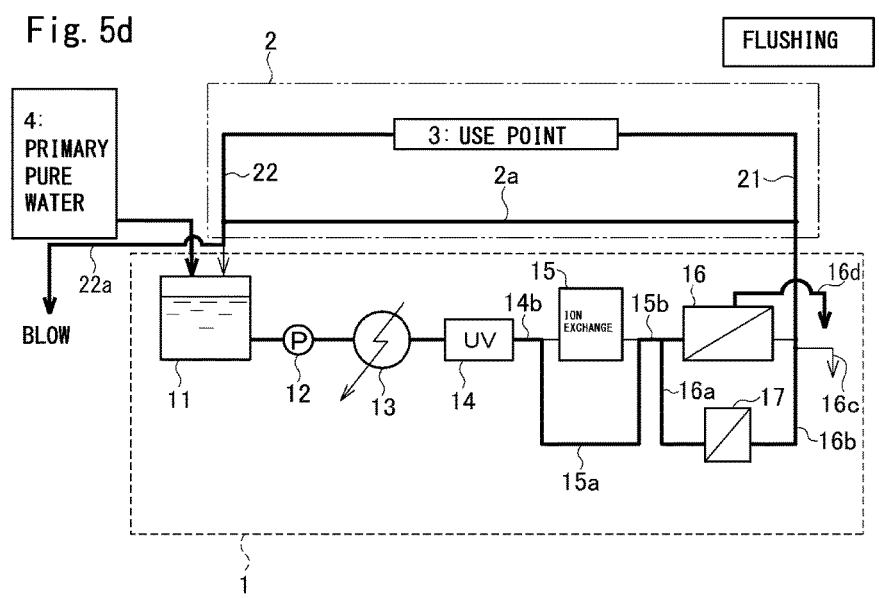
FIG. 5d is a block diagram of an ultrapure water production system and an ultrapure water production feed system according to a first embodiment.
Figure 5E:
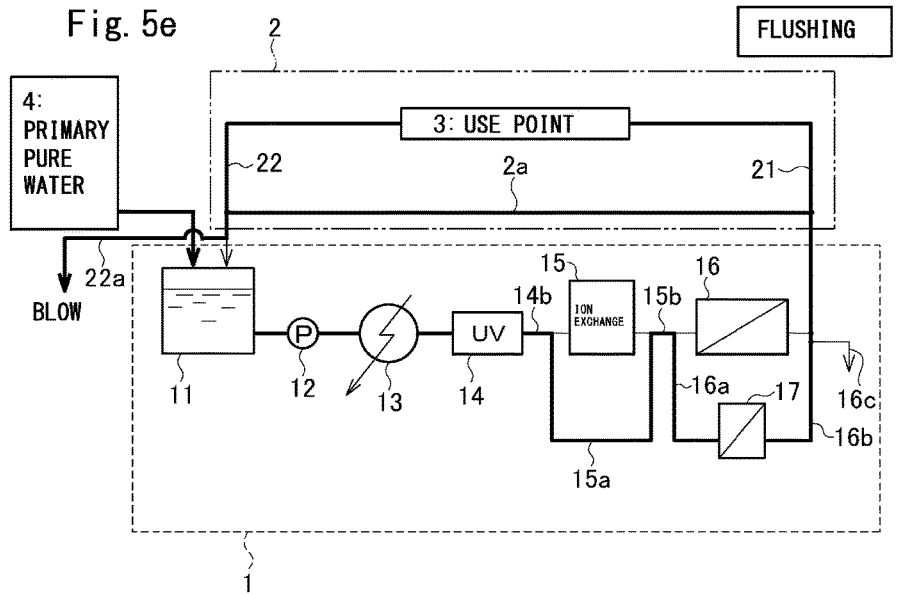
FIG. 5e is a block diagram of an ultrapure water production system and an ultrapure water production feed system according to a first embodiment.
Figure 5F:
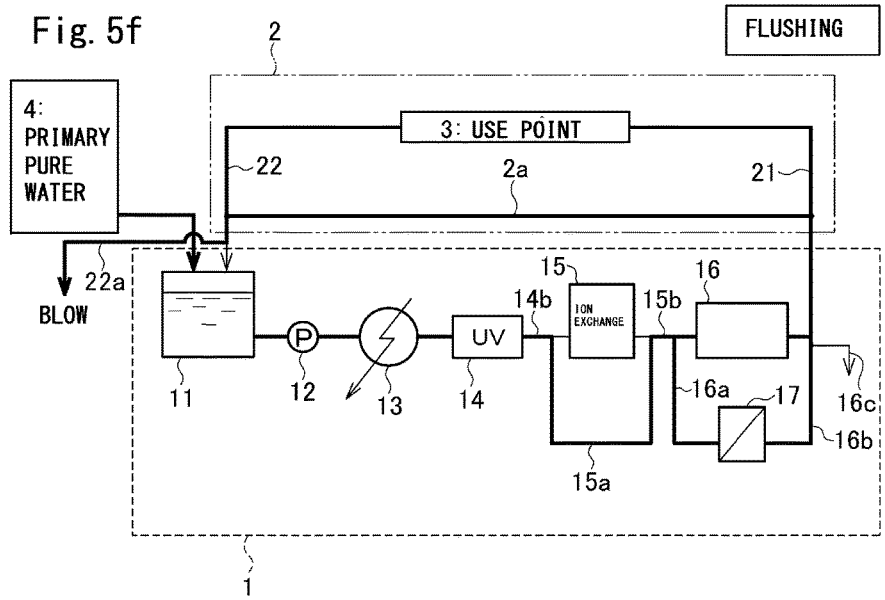
FIG. 5f is a block diagram of an ultrapure water production system and an ultrapure water production feed system according to a first embodiment.

In order to perform cleaning sterilization or sterilization of the ultrapure water production system 1 and the ultrapure water feed pipe system 2, water is passed through the systems in the order of FIG. 2→FIG. 3→FIG. 4→FIGS. 5a to 5c→FIGS. 5d to 5f→FIG. 3→FIG. 4→FIG. 6→FIGS. 5a to 5c→FIG. 4→FIG. 7→FIG. 8. In each figure, a pipe or tube denoted by a thick solid line is a pipe or tube through which water is passed and a pipe or tube denoted by a thin solid line is a pipe or tube through which water is not passed.

<FIG. 2: Cleaning of Second Microparticle Removal Membrane Device>

While ultrapure water produced in the first microparticle removal membrane device 16 is fed to the use point 3 as illustrated in FIG. 1 and excess water is returned to the tank 11, part of water discharged from the ion-exchange device 15 is fed into a microparticle removal membrane device 17 to which a membrane is not attached through the bypass pipe 16a and discharged to the outside of the system through the blow pipe 16c in order to perform blowing for a certain period of time as illustrated in FIG. 2. When a resistivity of 18 MΩ·cm or more is achieved, a microparticle removal membrane is attached to the second microparticle removal membrane device 17.

<FIG. 3: Alkali Cleaning>

The number of microparticles contained in blow water discharged through the blow pipe 16c is measured. After the number of the microparticles has been confirmed to be equal to or less than a predetermined number (e.g., number of microparticles having a diameter of 50 nm or more is 500 particle/L or less), the ultrapure water production system 1 and the ultrapure water feed pipe system 2 are subjected to alkali cleaning. Valve selection (channel switching) is made such that water is diverted from the ion-exchange device 15 and the first microparticle removal membrane device 16 of the ultrapure water production system 1 as illustrated in FIG. 3. The water level in the tank 11 is set to "Level: low" and controlled to be a lowest level at which the pump can keep operating. In the case where optional bypass pipes are disposed such that the heat exchanger 13 and the ultraviolet device 14 are bypassed, valves of the optional bypass pipes are slightly opened such that the liquid is also passed through the optional bypass pipes. The valve of the bypass pipe 2a of the ultrapure water feed pipe system 2 is slightly opened such that the liquid is also passed through the bypass pipe 2a. The blow pipe 16c is closed.

Subsequently, an alkaline solution is charged into the tank 11 and circulated through the ultrapure water production system 1 and the ultrapure water feed pipe system 2 by using the pump 12 as illustrated in FIG. 3 such that water discharged from the ultrapure water production system is replaced with an alkaline solution having a pH of 9 or more. This alkali cleaning step is preferably conducted for 0.5 hr or more and is particularly preferably conducted for about 1 to 2 hr.

<FIG. 4: Flushing>

While the primary pure water 4 is fed into the tank 11, the second blow pipe 22a, which is branched from the pipe 22 at the end (downstream of a portion at which the pipe 22 merges with the bypass pipe 2a) of the pipe 22, is opened and the returned water is blown off to the outside of the system as illustrated in FIG. 4 in order to wash away the alkaline solution contained in the ultrapure water production system 1 and the ultrapure water feed pipe system 2 with the primary pure water 4 to the outside of the system, that is, perform flushing.

<FIGS. 5a to 5c: Sterilization Cleaning>

After wastewater resulting from flushing (water discharged through the blow pipe 22a) has been confirmed to have a pH of 8 or less and/or a resistivity of 10 MΩ·cm or more, sterilization cleaning of the inside of the ultrapure water production system 1 and the inside of the ultrapure water feed pipe system 2 by using sterilization water, which is illustrated in FIG. 5a, FIG. 5b, or FIG. 5c, is performed.

<FIG. 5a: Sterilization Cleaning Method 1>

Valve selection is made such that the ion-exchange device 15 of the ultrapure water production system 1 is bypassed; water is passed through both first microparticle removal membrane device 16 and second microparticle removal membrane device 17; and sterilization water passed into a feedwater-side (primary side) portion of the membrane is discharged to the outside of the system through a concentrated-water pipe 16d without permeating through the membrane of the first microparticle removal membrane device 16 as illustrated in FIG. 5a. The water level in the tank 11 is adjusted accordingly. In the case where optional bypass pipes are disposed such that the heat exchanger 13 and the ultraviolet device 14 are bypassed, the lines are slightly opened.

The valve of the bypass pipe 2a of the ultrapure water feed pipe system 2 is slightly opened such that the sterilization water is also passed through the bypass pipe 2a. The blow pipe 16c is closed. Subsequently, heating is performed using the heat exchanger 13 as needed until the required temperature is reached and hydrogen peroxide is charged into the tank 11 and circulated in the ultrapure water production system 1 and the ultrapure water feed pipe system 2 by using pump 12 in order to replace the ultrapure water contained in the ultrapure water production system 1 and the ultrapure water feed pipe system 2 with the sterilization water.

In this sterilization cleaning step, the sterilization water does not permeate through the first microparticle removal membrane device 16 and only the feedwater-side portion of the membrane is subjected to sterilization cleaning. However, the sterilization water fed into the feedwater-side portion of the membrane percolates to a secondary-side (permeation side) portion of the membrane, and thereby the secondary-side (permeation side) portion of the membrane can be sterilized.

<FIG. 5b: Sterilization Cleaning Method 2>

Valve selection is made such that the ion-exchange device 15 and the first microparticle removal membrane device 16 of the ultrapure water production system 1 are bypassed; and water is passed through the second microparticle removal membrane device 17 as illustrated in FIG. 5b. The water level in the tank 11 is adjusted accordingly. In the case where optional bypass pipes are disposed such that the heat exchanger 13 and the ultraviolet device 14 are bypassed, the lines are slightly opened. The valve of the bypass pipe 2a of the ultrapure water feed pipe system 2 is slightly opened such that the sterilization water is also passed through the bypass pipe 2a. The blow pipe 16c is closed. Subsequently, heating is performed using the heat exchanger 13 as needed until the required temperature is reached and hydrogen peroxide is charged into the tank 11 and circulated in the ultrapure water production system 1 and the ultrapure water feed pipe system 2 by using pump 12 in order to replace the ultrapure water contained in the ultrapure water production system 1 and the ultrapure water feed pipe system 2 with the sterilization water.

<FIG. 5c: Sterilization Cleaning Method 3>

After the microparticle removal membrane of the first microparticle removal membrane device 16 has been replaced with a pipe, valve selection is made such that the ion-exchange device 15 of the ultrapure water production system 1 is bypassed; and water is passed through both first microparticle removal membrane device 16 and second microparticle removal membrane device 17 as illustrated in FIG. 5c. The water level in the tank 11 is adjusted accordingly. In the case where optional bypass pipes are disposed such that the heat exchanger 13 and the ultraviolet device 14 are bypassed, the lines are slightly opened. The valve of the bypass pipe 2a of the ultrapure water feed pipe system 2 is slightly opened such that the sterilization water is also passed through the bypass pipe 2a. The blow pipe 16c is closed. Subsequently, heating is performed using the heat exchanger 13 as needed until the required temperature is reached and hydrogen peroxide is charged into the tank 11 and circulated in the ultrapure water production system 1 and the ultrapure water feed pipe system 2 by using pump 12 in order to replace the ultrapure water contained in the ultrapure water production system 1 and the ultrapure water feed pipe system 2 with the sterilization water.

Sterilization cleaning in accordance with any one of the above sterilization cleaning methods 1 to 3 is preferably performed for 0.5 hr or more and is particularly preferably performed for 1 to 2 hr.

<FIG. 5d to 5f: Flushing>

While the primary pure water 4 is fed into the tank 11, the second blow pipe 22a branched from the pipe 22 at the end (downstream of the point at which the pipe 22 merges with the bypass pipe 2a) of the pipe 22 is opened in order to wash away the sterilization water contained in the ultrapure water production system 1 and the ultrapure water feed pipe system 2 with the primary pure water 4 to the outside of the system as illustrated in FIG. 5d in the case where the sterilization cleaning method 1 illustrated in FIG. 5a is employed, as illustrated in FIG. 5e in the case where the sterilization cleaning method 2 illustrated in FIG. 5b is employed, or as illustrated in FIG. 5f in the case where the sterilization cleaning method 3 illustrated in FIG. 5c is employed. This flushing step is conducted until the concentration of hydrogen peroxide in flush water discharged through the blow pipe 22a reaches 1 mg/L or less.

In the case where the sterilization cleaning method 2 illustrated in FIG. 5b is employed, subsequent to the above-described flushing cleaning step, the microparticle removal membrane of the first microparticle removal membrane device 16 is replaced with a sterilized microparticle removal membrane. The replacement of the membrane may be performed prior to sterilization and flushing cleaning. In the case where the sterilization cleaning method 3 illustrated in FIG. 5c is employed, subsequent to the above-described flushing cleaning step, the pipe of the first microparticle removal membrane device 16 is replaced with a sterilized microparticle removal membrane.

<FIG. 3: Second Alkali Cleaning>

After the termination of flushing, alkali cleaning (second alkali cleaning) is again performed as illustrated in FIG. 3. This cleaning step is conducted in the same manner as in the first alkali cleaning step.

<FIG. 4: Flushing>

Subsequent to second alkali cleaning, flushing is performed as illustrated in FIG. 4. This flushing step is conducted as in the above-described flushing step.

<FIG. 6 and FIGS. 5a to 5c: Second Sterilization Cleaning>

After the termination of the flushing step above, second sterilization cleaning is performed using hydrogen peroxide. In the first half of this second sterilization cleaning step, water is passed through the systems as illustrated in FIG. 6.

The water-passing method illustrated in FIG. 6 is basically the same as those illustrated in FIGS. 5a to 5c, but differs from those illustrated in FIGS. 5a to 5c in that water containing hydrogen peroxide passed through the bypass pipe 15a is passed through not only the second microparticle removal membrane device 17 but also the first microparticle removal membrane device 16. The other water-passing conditions are the same as in FIGS. 5a to 5c. The sterilization cleaning step illustrated in FIG. 6 is preferably conducted for 0.5 hr or more and is particularly preferably conducted for about 0.5 to 1 hr.

After the termination of the sterilization cleaning step illustrated in FIG. 6, the sterilization cleaning step illustrated in FIGS. 5a to 5c is conducted. The sterilization cleaning step illustrated in FIGS. 5a to 5c is preferably conducted for 1 to 24 hr and is particularly preferably conducted for about 2 to 12 hr.

<FIG. 4: Flushing>

Flushing is performed by the method illustrated in FIG. 4. Water-passing conditions under which this flushing step is conducted are the same as in the above-described flushing step.

<FIG. 7: First Finishing>

The first finishing water-passing step illustrated in FIG. 7 is conducted. The first finishing water-passing step is substantially the same as the flushing water-passing step illustrated in FIG. 4, but differs from the flushing step illustrated in FIG. 4 in that water discharged from the ultraviolet device 14 is passed through not only the bypass pipe 15a but also the ion-exchange device 15. The other conditions are the same as in the flushing step illustrated in FIG. 4.

<Second Finishing>

The second finishing water-passing step illustrated in FIG. 8 is conducted. The second finishing water-passing step is different from the first finishing water-passing step illustrated in FIG. 7 in the following respects 1) to 3). The other conditions are the same as in the first finishing water-passing step.

1) Water discharged from the ultraviolet oxidation device 14 is not passed through the bypass pipe 15a and is passed through only the ion-exchange device 15.

2) Water discharged from the ion-exchange device 15 is passed through both first microparticle removal membrane device 16 and second microparticle removal membrane device 17.

3) Water discharged from the microparticle removal membrane devices 16 and 17 is not passed to the water use point 3, and the whole amount of water discharged from the microparticle removal membrane devices 16 and 17 is passed through the bypass pipe 2a.

The second finishing water-passing step is conducted until the quality of water discharged through the blow pipe 22a reaches the targeted quality of ultrapure water. After the termination of second finishing water-passing, the system is returned to the steady-state operation illustrated in FIG. 1.

[Second Embodiment]

FIGS. 9 to 15 illustrate the second embodiment of the present invention.

The ultrapure water production system 1 and the ultrapure water feed pipe system 2 according to the second embodiment illustrated in FIGS. 9 to 15 have the same structure as those illustrated in FIG. 1, except that the second microparticle removal membrane device 17 is interposed between bypass pipes 15c and 15d of the ion-exchange device 15 and the blow pipe 16c is disposed at a midpoint of the bypass pipe 15d.

In FIGS. 9 to 15, Reference numeral 15c denotes a portion of the bypass pipe of the ion-exchange device 15 which is located upstream of the second microparticle removal membrane device 17, and Reference numeral 15d denotes a portion of the bypass pipe of the ion-exchange device 15 which is located downstream of the second microparticle removal membrane device 17. The other reference numerals in FIGS. 9 to 15 denote the same portions as in FIGS. 1 to 8.

During the steady-state operation, as illustrated in FIG. 1, water (raw water of ultrapure water) contained in the tank 11 is conveyed using the pump 12 and treated in the heat exchanger 13, the ultraviolet device 14, the ion-exchange device 15, and the first microparticle removal membrane device 16 successively. Thus, ultrapure water is produced. Ultrapure water produced in the ultrapure water production system 1 is fed to the water use point 3 through the channel 21. Part of the ultrapure water is used at the water use point 3, and the unused part of the ultrapure water is returned to the ultrapure water production system 1 through the channel 22.

[Example Cleaning Process]

Figure 10:
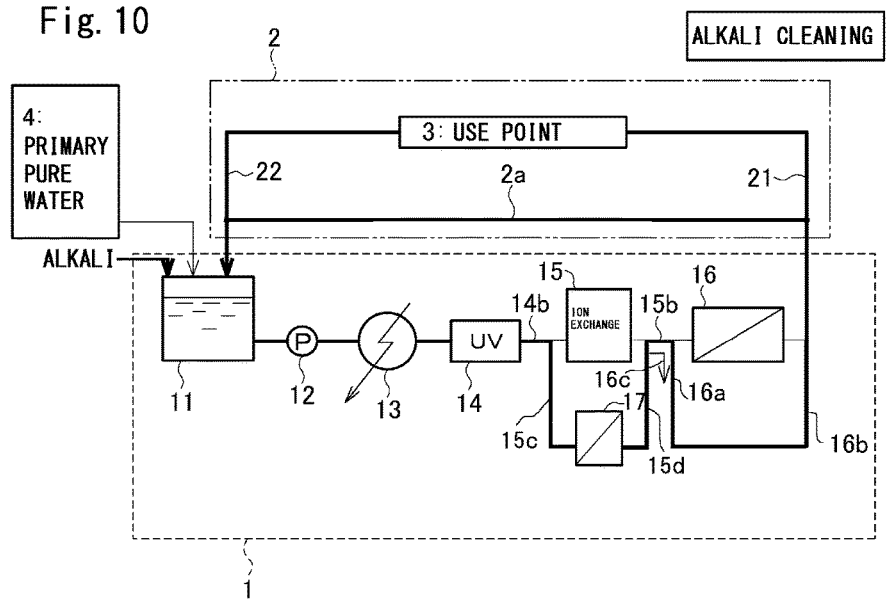
FIG. 10 is a block diagram of an ultrapure water production system and an ultrapure water production feed system according to a second embodiment.
Figure 11:
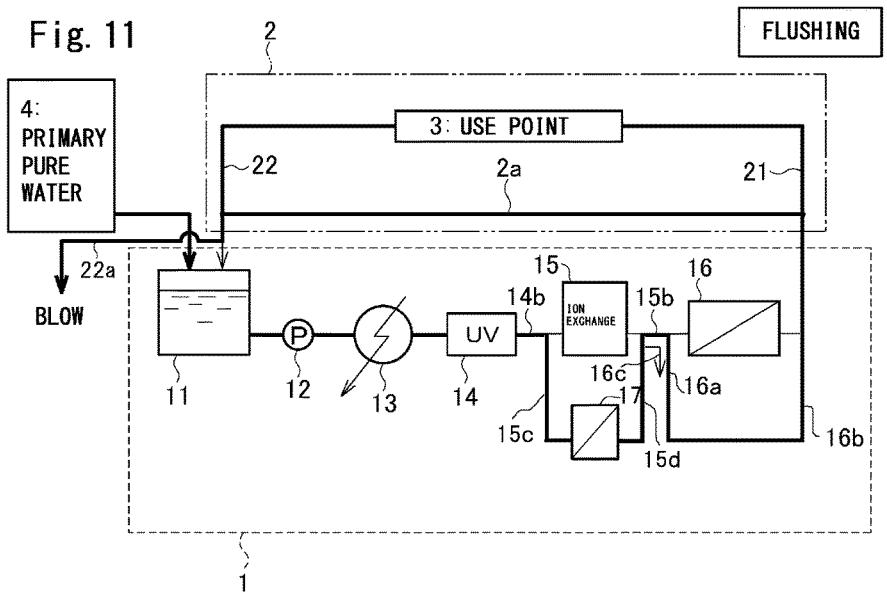
FIG. 11 is a block diagram of an ultrapure water production system and an ultrapure water production feed system according to a second embodiment.
Figure 12A:
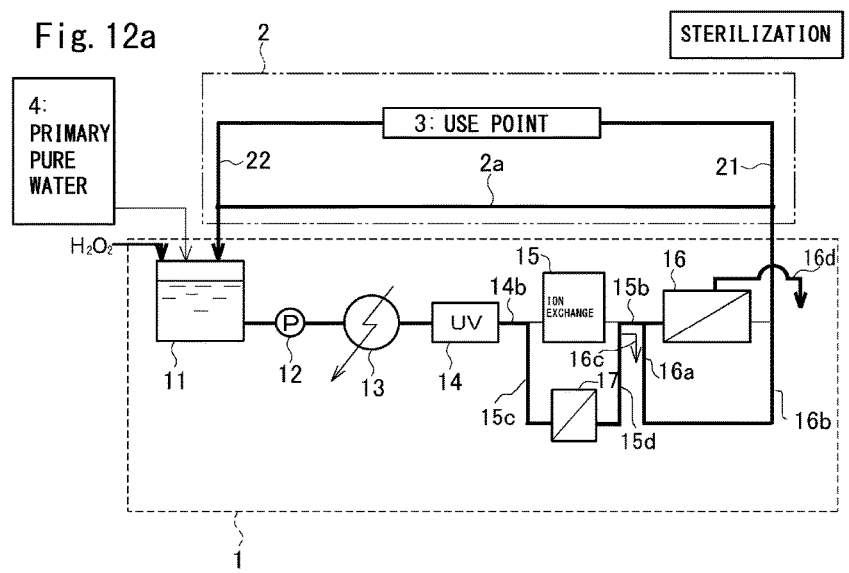
FIG. 12a is a block diagram of an ultrapure water production system and an ultrapure water production feed system according to a second embodiment.
Figure 12B:
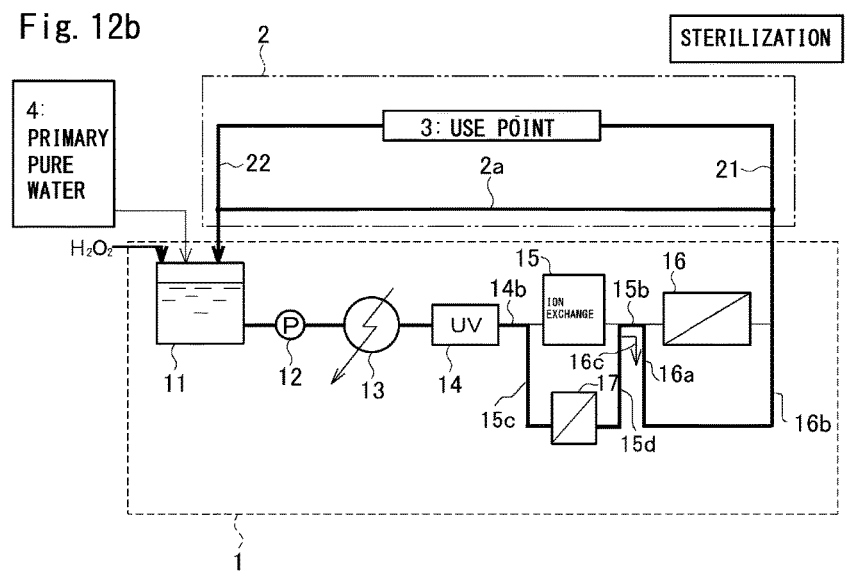
FIG. 12b is a block diagram of an ultrapure water production system and an ultrapure water production feed system according to a second embodiment.
Figure 15:
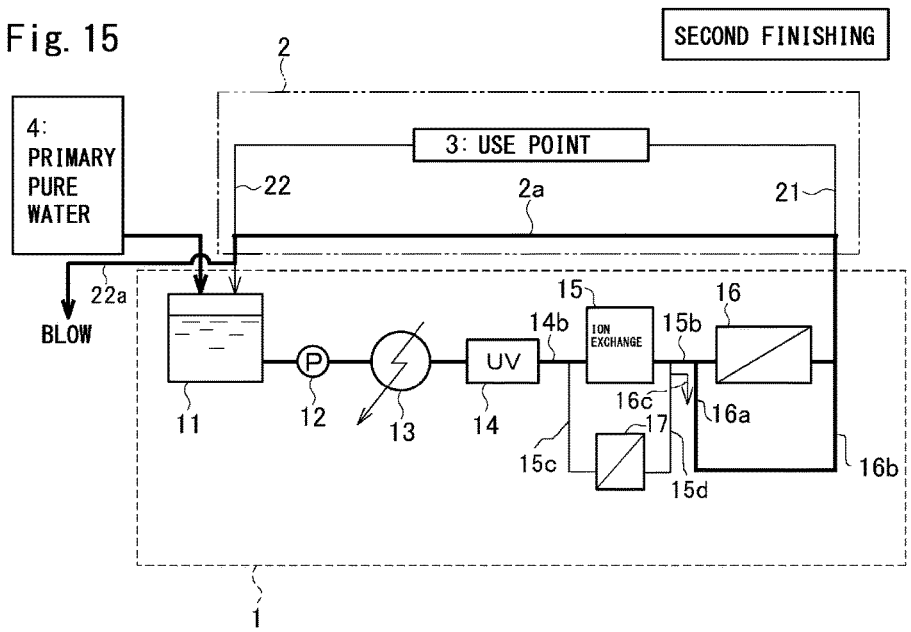
FIG. 15 is a block diagram of an ultrapure water production system and an ultrapure water production feed system according to a second embodiment.

In order to perform cleaning sterilization or sterilization of the ultrapure water production system 1 and the ultrapure water feed pipe system 2, water is passed through the systems in the order of FIG. 9→FIG. 10→FIG. 11→FIGS. 12a to 12c→FIGS. 12d to 12f→FIG. 10→FIG. 11→FIG. 13→FIGS. 12a to 12c→FIG. 11→FIG. 14→FIG. 15. In each figure, a pipe or tube denoted by a thick solid line is a pipe or tube through which water is passed and a pipe or tube denoted by a thin solid line is a pipe or tube through which water is not passed.

<FIG. 9: Cleaning of Second Microparticle Removal Membrane Device>

While ultrapure water produced in the first microparticle removal membrane device 16 is fed to the use point 3 as illustrated in FIG. 2 and excess water is returned to the tank 11, part of water discharged from the ultraviolet device 14 is fed into a microparticle removal membrane device 17 to which a membrane is not attached through the bypass pipe 15c and discharged to the outside of the system through the blow pipe 16c in order to perform blowing for a certain period of time as illustrated in FIG. 9. When a resistivity of 18 MΩ·cm or more is achieved, a microparticle removal membrane is attached to the second microparticle removal membrane device 17.

<FIG. 10: Alkali Cleaning>

The number of microparticles contained in blow water discharged through the blow pipe 16c is measured. After the number of the microparticles has been confirmed to be equal to or less than a predetermined number (e.g., number of microparticles having a diameter of 50 nm or more is 500 particle/L or less), the ultrapure water production system 1 and the ultrapure water feed pipe system 2 are subjected to alkali cleaning. Valve selection (channel switching) is made such that water is diverted from the ion-exchange device 15 and the first microparticle removal membrane device 16 of the ultrapure water production system 1 as illustrated in FIG. 10. The water level in the tank 11 is set to "Level: low" and controlled to be a lowest level at which the pump can keep operating. In the case where optional bypass pipes are disposed such that the heat exchanger 13 and the ultraviolet device 14 are bypassed, valves of the optional bypass pipes are slightly opened such that the liquid is also passed through the optional bypass pipes. The valve of the bypass pipe 2a of the ultrapure water feed pipe system 2 is slightly opened such that the liquid is also passed through the bypass pipe 2a. The blow pipe 16c is closed.

Subsequently, an alkaline solution is charged into the tank 11 and circulated through the ultrapure water production system 1 and the ultrapure water feed pipe system 2 by using the pump 12 as illustrated in FIG. 10 such that water discharged from the ultrapure water production system 1 is replaced with an alkaline solution having a pH of 9 or more. This alkali cleaning step is preferably conducted for 0.5 hr or more and is particularly preferably conducted for about 1 to 2 hr.

<FIG. 11: Flushing>

While the primary pure water 4 is fed into the tank 11, the second blow pipe 22a, which is branched from the pipe 22 at the end (downstream of a portion at which the pipe 22 merges with the bypass pipe 2a) of the pipe 22, is opened and the returned water is blown off to the outside of the system as illustrated in FIG. 11 in order to wash away the alkaline solution contained in the ultrapure water production system 1 and the ultrapure water feed pipe system 2 with the primary pure water 4 to the outside of the system, that is, perform flushing.

<FIGS. 12a to 12c: Sterilization Cleaning>

After wastewater resulting from flushing (water discharged through the blow pipe 22a) has been confirmed to have a pH of 8 or less and/or a resistivity of 10 MΩ·cm or more, sterilization cleaning of the inside of the ultrapure water production system 1 and the inside of the ultrapure water feed pipe system 2 by using sterilization water, which is illustrated in FIG. 12a, FIG. 12b, or FIG. 12c, is performed.

<FIG. 12a: Sterilization Cleaning Method 1>

Valve selection is made such that the ion-exchange device 15 of the ultrapure water production system 1 is bypassed and water is passed through the second microparticle removal membrane device 17; water is fed into both bypass pipes 16a and 16b and first microparticle removal membrane device 16; and sterilization water passed into a feedwater-side (primary side) portion of the membrane is discharged to the outside of the system through a concentrated-water pipe 16d without permeating through the membrane of the first microparticle removal membrane device 16 as illustrated in FIG. 12a. The water level in the tank 11 is adjusted accordingly. In the case where optional bypass pipes are disposed such that the heat exchanger 13 and the ultraviolet device 14 are bypassed, the lines are slightly opened.

The valve of the bypass pipe 2a of the ultrapure water feed pipe system 2 is slightly opened such that the sterilization water is also passed through the bypass pipe 2a. The blow pipe 16c is closed. Subsequently, heating is performed using the heat exchanger 13 as needed until the required temperature is reached and hydrogen peroxide is charged into the tank 11 and circulated in the ultrapure water production system 1 and the ultrapure water feed pipe system 2 by using pump 12 in order to replace the ultrapure water contained in the ultrapure water production system 1 and the ultrapure water feed pipe system 2 with the sterilization water.

In this sterilization cleaning step, the sterilization water does not permeate through the first microparticle removal membrane device 16 and only the feedwater-side portion of the membrane is subjected to sterilization cleaning. However, the sterilization water fed into the feedwater-side portion of the membrane percolates to a secondary-side (permeation side) portion of the membrane, and thereby the secondary-side (permeation side) portion of the membrane can be sterilized.

<FIG. 12*b*: Sterilization Cleaning Method 2>

Valve selection is made such that the ion-exchange device 15 of the ultrapure water production system 1 is bypassed and water is passed through the second microparticle removal membrane device 17; and the first microparticle removal membrane device 16 is bypassed and water is passed through the bypass pipes 16*a* and 16*b* as illustrated in FIG. 12*b*. The water level in the tank 11 is adjusted accordingly. In the case where optional bypass pipes are disposed such that the heat exchanger 13 and the ultraviolet device 14 are bypassed, the lines are slightly opened. The valve of the bypass pipe 2*a* of the ultrapure water feed pipe system 2 is slightly opened such that the sterilization water is also passed through the bypass pipe 2*a*. The blow pipe 16*c* is closed. Subsequently, heating is performed using the heat exchanger 13 as needed until the required temperature is reached and hydrogen peroxide is charged into the tank 11 and circulated in the ultrapure water production system 1 and the ultrapure water feed pipe system 2 by using pump 12 in order to replace the ultrapure water contained in the ultrapure water production system 1 and the ultrapure water feed pipe system 2 with the sterilization water.

<FIG. 12*c*: Sterilization Cleaning Method 3>

After the microparticle removal membrane of the first microparticle removal membrane device 16 has been replaced with a pipe, valve selection is made such that the ion-exchange device 15 of the ultrapure water production system 1 is bypassed and water is passed through the second microparticle removal membrane device 17; and water is passed through both first microparticle removal membrane device 16 and bypass pipes 16*a* and 16*b* as illustrated in FIG. 12*c*. The water level in the tank 11 is adjusted accordingly. In the case where optional bypass pipes are disposed such that the heat exchanger 13 and the ultraviolet device 14 are bypassed, the lines are slightly opened. The valve of the bypass pipe 2*a* of the ultrapure water feed pipe system 2 is slightly opened such that the sterilization water is also passed through the bypass pipe 2*a*. The blow pipe 16*c* is closed. Subsequently, heating is performed using the heat exchanger 13 as needed until the required temperature is reached and hydrogen peroxide is charged into the tank 11 and circulated in the ultrapure water production system 1 and the ultrapure water feed pipe system 2 by using pump 12 in order to replace the ultrapure water contained in the ultrapure water production system 1 and the ultrapure water feed pipe system 2 with the sterilization water.

Sterilization cleaning in accordance with any one of the above sterilization cleaning methods 1 to 3 is preferably performed for 0.5 hr or more and is particularly preferably performed for 1 to 2 hr.

<FIG. 12*d* to 12*f*: Flushing>

While the primary pure water 4 is fed into the tank 11, the second blow pipe 22*a* branched from the pipe 22 at the end (downstream of the point at which the pipe 22 merges with the bypass pipe 2*a*) of the pipe 22 is opened in order to wash away the sterilization water contained in the ultrapure water production system 1 and the ultrapure water feed pipe system 2 with the primary pure water 4 to the outside of the system as illustrated in FIG. 12*d* in the case where the sterilization cleaning method 1 illustrated in FIG. 12*a* is employed, as illustrated in FIG. 12*e* in the case where the sterilization cleaning method 2 illustrated in FIG. 12*b* is employed, or as illustrated in FIG. 12*f* in the case where the sterilization cleaning method 3 illustrated in FIG. 12*c* is employed. This flushing step is conducted until the concentration of hydrogen peroxide in flush water discharged through the blow pipe 22*a* reaches 1 mg/L or less.

In the case where the sterilization cleaning method 2 illustrated in FIG. 12*b* is employed, subsequent to the above-described flushing cleaning step, the microparticle removal membrane of the first microparticle removal membrane device 16 is replaced with a sterilized microparticle removal membrane. The replacement of the membrane may be performed prior to sterilization and flushing cleaning. In the case where the sterilization cleaning method 3 illustrated in FIG. 12*c* is employed, subsequent to the above-described flushing cleaning step, the pipe of the first microparticle removal membrane device 16 is replaced with a sterilized microparticle removal membrane.

<FIG. 10: Second Alkali Cleaning>

After the termination of flushing, alkali cleaning (second alkali cleaning) is again performed as illustrated in FIG. 10. This cleaning step is conducted in the same manner as in first alkali cleaning.

<FIG. 11: Flushing>

Subsequent to second alkali cleaning, flushing is performed as illustrated in FIG. 11. This flushing step is conducted as in the above-described flushing step.

<FIG. 13 and FIGS. 12*a* to 12*c*: Second Sterilization Cleaning>

After the termination of the flushing step above, second sterilization cleaning is performed using hydrogen peroxide. In the first half of this second sterilization cleaning step, water is passed through the systems as illustrated in FIG. 13.

The water-passing method illustrated in FIG. 13 is basically the same as those illustrated in FIGS. 12*a* to 12*c*, but differs from those illustrated in FIGS. 12*a* to 12*c* in that water containing hydrogen peroxide passed through the bypass pipe 15*d* is passed through not only the bypass pipes 16*a* and 16*b* but also the first microparticle removal membrane device 16. The other water-passing conditions are the same as in FIGS. 12*a* to 12*c*. The sterilization cleaning step illustrated in FIG. 13 is preferably conducted for 0.5 hr or more and is particularly preferably conducted for about 0.5 to 1 hr.

After the termination of the sterilization cleaning step illustrated in FIG. 13, the sterilization cleaning step illustrated in FIGS. 12*a* to 12*c* is conducted. The sterilization cleaning step illustrated in FIGS. 12*a* to 12*c* is preferably conducted for 1 to 24 hr and is particularly preferably conducted for about 2 to 12 hr.

<FIG. 11: Flushing>

Flushing is performed by the method illustrated in FIG. 11. Water-passing conditions under which this flushing step is conducted are the same as in the above-described flushing step.

<FIG. 14: First Finishing>

First finishing water-passing illustrated in FIG. 14 is performed. The first finishing water-passing step is substantially the same as the flushing water-passing step illustrated in FIG. 11, but differs from the flushing step illustrated in FIG. 11 in that water discharged from the ultraviolet device 14 is passed through not only the microparticle removal membrane device 17 but also the ion-exchange device 15. The other conditions are the same as in the flushing step illustrated in FIG. 11.

<Second Finishing>

The second finishing water-passing step illustrated in FIG. 15 is conducted. The second finishing water-passing step is different from the first finishing water-passing step illustrated in FIG. 14 in the following respects 1) to 3). The other conditions are the same as in the first finishing water-passing step.

1) Water discharged from the ultraviolet oxidation device 14 is not passed through the microparticle removal membrane device 17 and is passed through only the ion-exchange device 15.

2) Water discharged from the ion-exchange device 15 is passed through both first microparticle removal membrane device 16 and bypass pipes 16a and 16b.

3) Water discharged from the microparticle removal membrane device 16 is not passed to the use point 3, and the whole amount of water discharged from the microparticle removal membrane device 16 is passed through the bypass pipe 2a.

The second finishing water-passing step is conducted until the quality of water discharged through the blow pipe 22a reaches the targeted quality of ultrapure water. After the termination of second finishing water-passing, the system is returned to the steady-state operation.

[Third Embodiment]

FIGS. 16 to 23 illustrate the third embodiment of the present invention.

The ultrapure water production system 1 and the ultrapure water feed pipe system 2 according to the third embodiment illustrated in FIGS. 16 to 23 have the same structure as those illustrated in FIG. 1, except that the second microparticle removal membrane device 17 is interposed between bypass pipes 16a and 16b branched from the pipe 20 disposed downstream of the first microparticle removal membrane device 16 and a bypass pipe 16e is disposed such that the first microparticle removal membrane device 16 is bypassed. The bypass pipe 16e may be omitted in the case where the third sterilization cleaning method is employed in the sterilization cleaning step described below. The other reference numerals in FIGS. 16 to 23 denote the same portions as in FIGS. 1 to 8.

Figure 16:
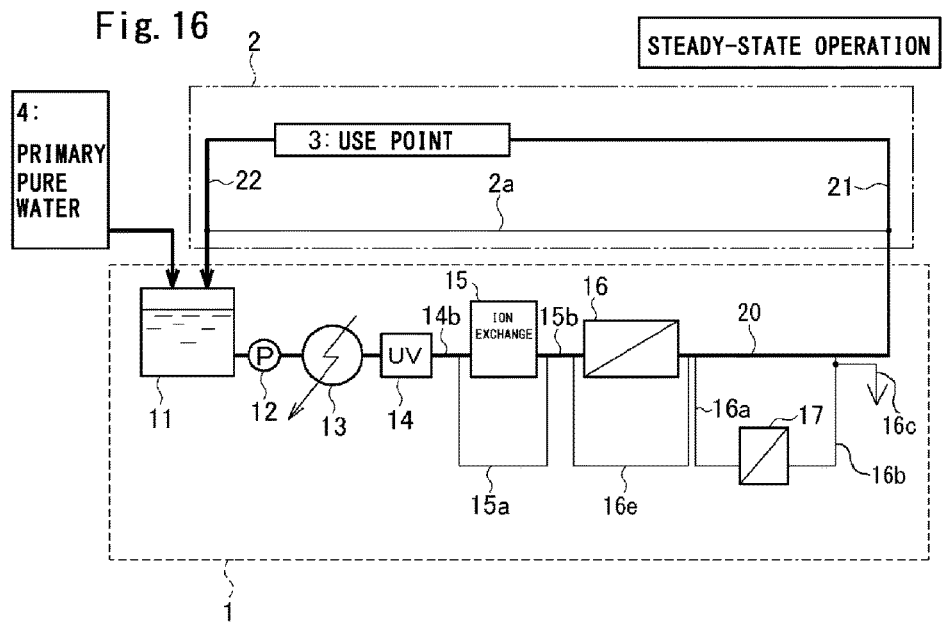
FIG. 16 is a block diagram of an ultrapure water production system and an ultrapure water production feed system according to a third embodiment.

During the steady-state operation, as illustrated in FIG. 16, primary pure water 4 and ultrapure water returned through the ultrapure water feed pipe 22 are received in the tank 11. Water (raw water of ultrapure water) contained in the tank 11 is conveyed using the pump 12 and treated in the heat exchanger 13, the ultraviolet device 14, the ion-exchange device 15, and the first microparticle removal membrane device 16 successively. Thus, ultrapure water is produced.

[Example Cleaning Process]

Figure 17:
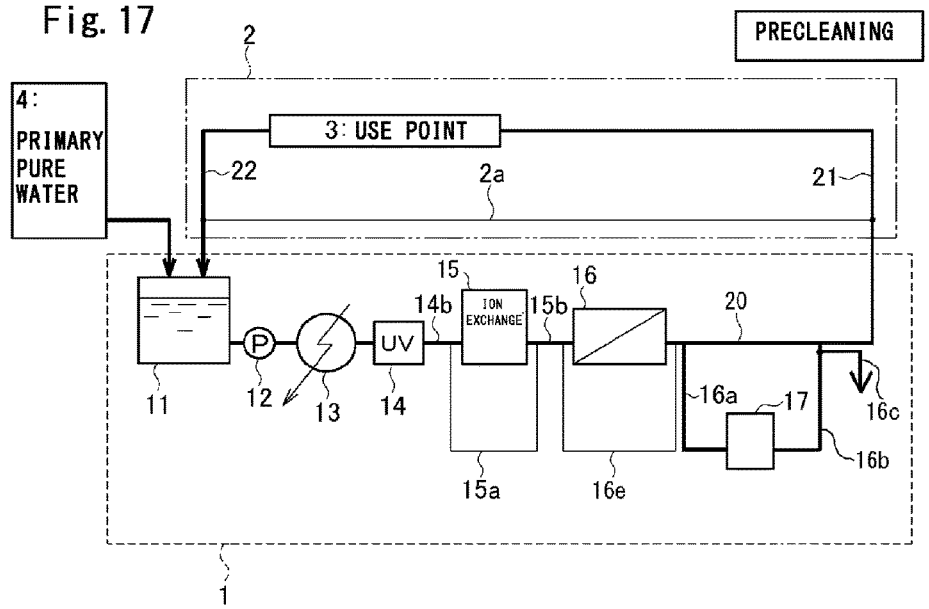
FIG. 17 is a block diagram of an ultrapure water production system and an ultrapure water production feed system according to a third embodiment.
Figure 18:
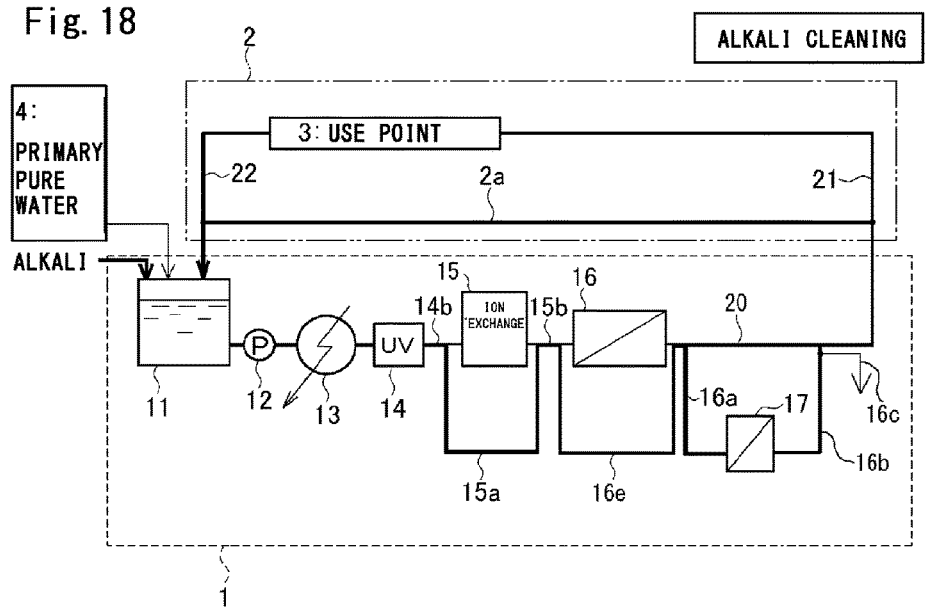
FIG. 18 is a block diagram of an ultrapure water production system and an ultrapure water production feed system according to a third embodiment.
Figure 19:
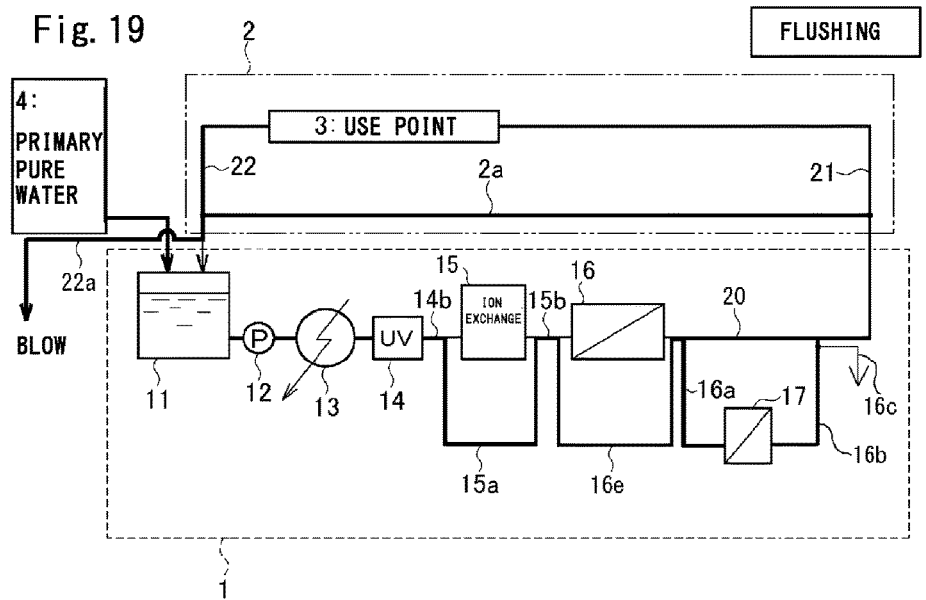
FIG. 19 is a block diagram of an ultrapure water production system and an ultrapure water production feed system according to a third embodiment.
Figure 20A:
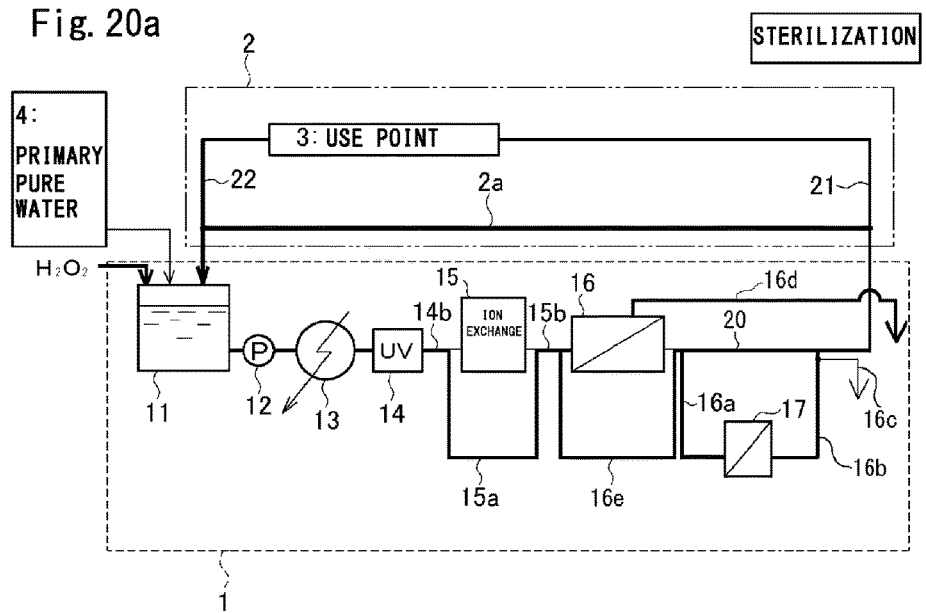
FIG. 20a is a block diagram of an ultrapure water production system and an ultrapure water production feed system according to a third embodiment.
Figure 20B:
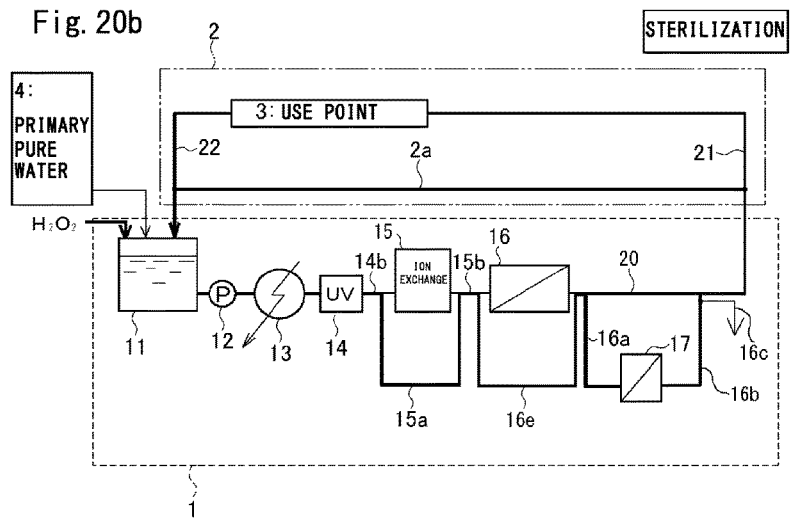
FIG. 20b is a block diagram of an ultrapure water production system and an ultrapure water production feed system according to a third embodiment.
Figure 20C:
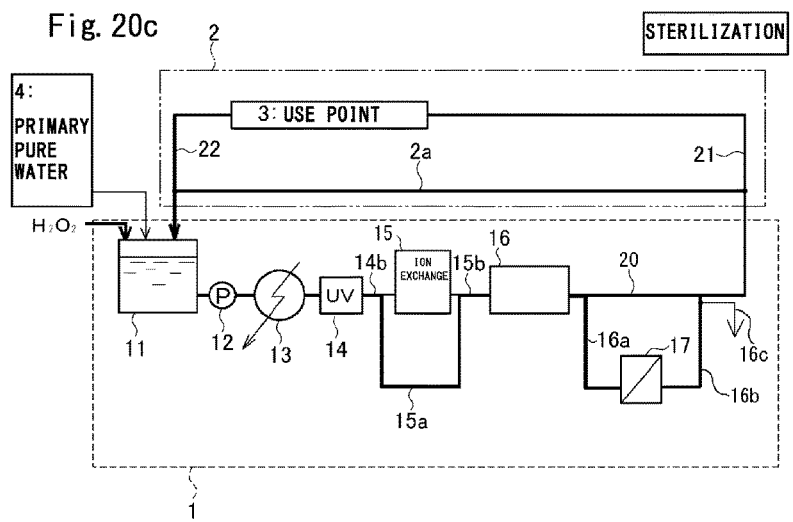
FIG. 20c is a block diagram of an ultrapure water production system and an ultrapure water production feed system according to a third embodiment.
Figure 20F:
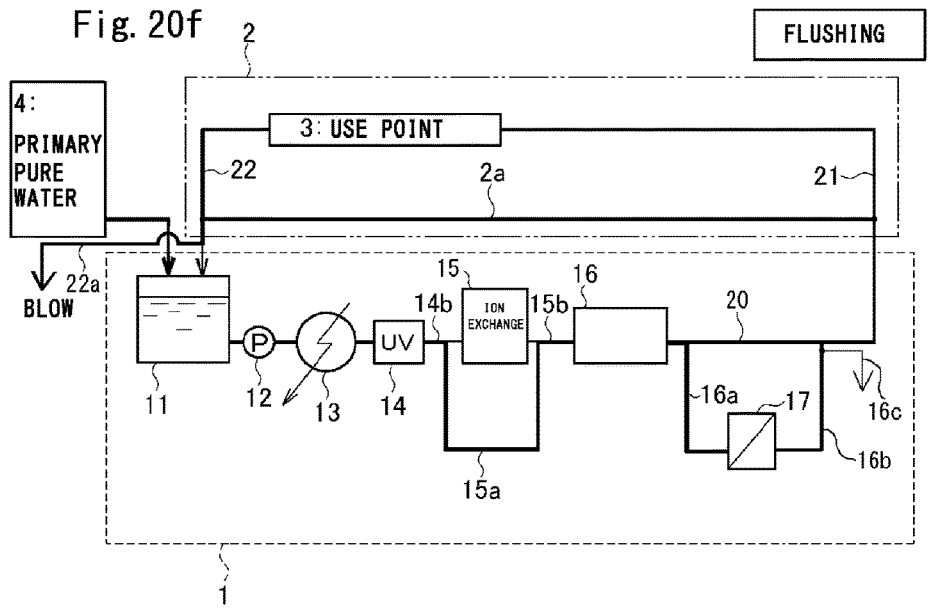
FIG. 20f is a block diagram of an ultrapure water production system and an ultrapure water production feed system according to a third embodiment.
Figure 21:
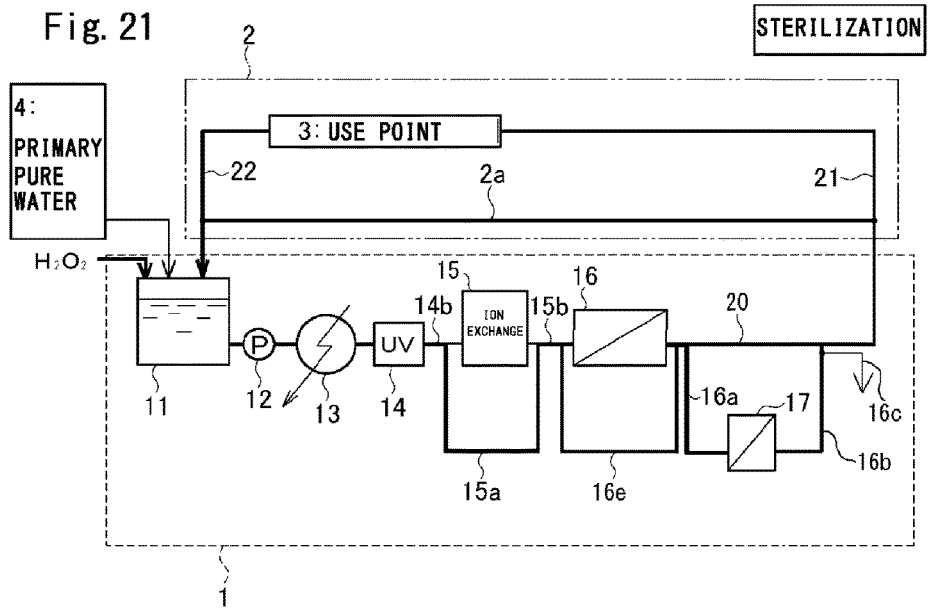
FIG. 21 is a block diagram of an ultrapure water production system and an ultrapure water production feed system according to a third embodiment.
Figure 22:
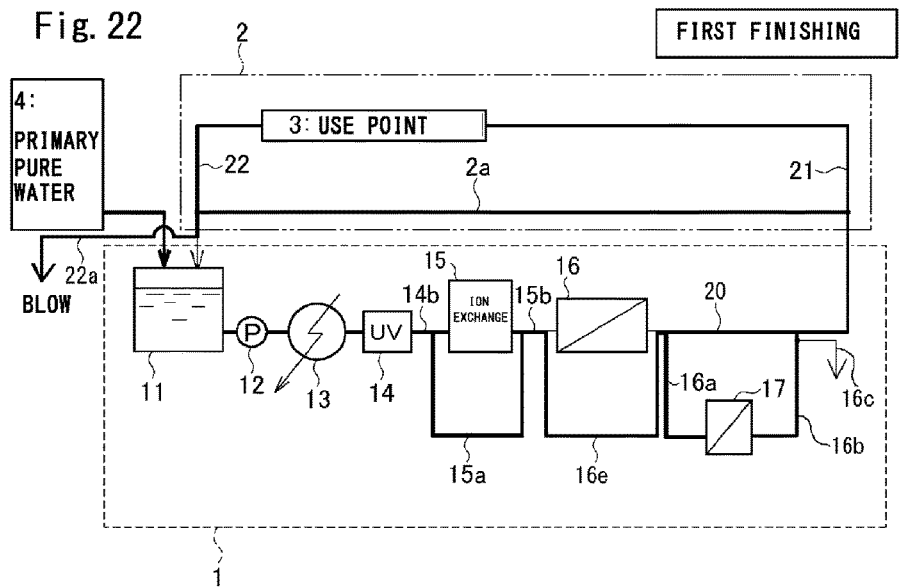
FIG. 22 is a block diagram of an ultrapure water production system and an ultrapure water production feed system according to a third embodiment.
Figure 23:
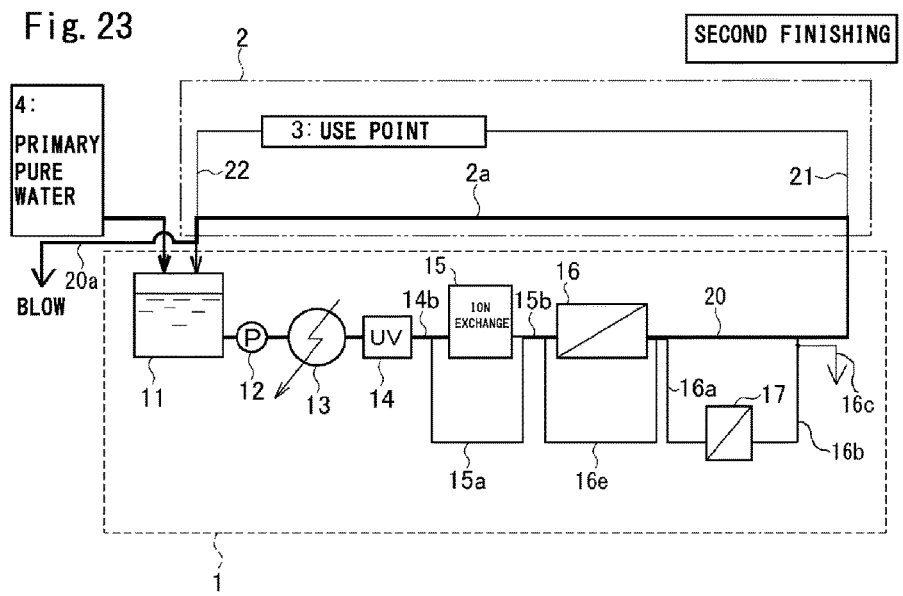
FIG. 23 is a block diagram of an ultrapure water production system and an ultrapure water production feed system according to a third embodiment.

In order to perform cleaning sterilization or sterilization of the ultrapure water production system 1 and the ultrapure water feed pipe system 2, water is passed through the systems in the order of FIG. 17→FIG. 18→FIG. 19→FIGS. 20a to 20c→FIGS. 20d to 20f→FIG. 18→FIG. 19→FIG. 21→FIGS. 20a to 20c→FIG. 19→FIG. 22→FIG. 23. In each figure, a pipe or tube denoted by a thick solid line is a pipe or tube through which water is passed and a pipe or tube denoted by a thin solid line is a pipe or tube through which water is not passed.

<FIG. 17: Cleaning of Second Microparticle Removal Membrane Device>

While ultrapure water produced in the first microparticle removal membrane device 16 is fed to the use point 3 as illustrated in FIG. 2 and excess water is returned to the tank 11, part of water discharged from the ultraviolet device 14 is fed into a microparticle removal membrane device 17 to which a membrane is not attached through the bypass pipe 16a and discharged to the outside of the system through the blow pipe 16c in order to perform blowing for a certain period of time as illustrated in FIG. 17. When a resistivity of 18 MΩ·cm or more is achieved, a microparticle removal membrane is attached to the second microparticle removal membrane device 17.

<FIG. 18: Alkali Cleaning>

The number of microparticles contained in blow water discharged through the blow pipe 16c is measured. After the number of the microparticles has been confirmed to be equal to or less than a predetermined number (e.g., number of microparticles having a diameter of 50 nm or more is 500 particle/L or less), the ultrapure water production system 1 and the ultrapure water feed pipe system 2 are subjected to alkali cleaning. Valve selection (channel switching) is made such that the liquid is diverted from the ion-exchange device 15 and the first microparticle removal membrane device 16 of the ultrapure water production system 1 and the liquid is passed through both pipe 20 and second microparticle removal membrane device 17 as illustrated in FIG. 18. The water level in the tank 11 is set to "Level: low" and controlled to be a lowest level at which the pump can keep operating. In the case where optional bypass pipes are disposed such that the heat exchanger 13 and the ultraviolet device 14 are bypassed, valves of the optional bypass pipes are slightly opened such that the alkaline solution is also passed through the optional bypass pipes. The valve of the bypass pipe 2a of the ultrapure water feed pipe system 2 is slightly opened such that the liquid is also passed through the bypass pipe 2a. The blow pipe 16c is closed.

Subsequently, an alkaline solution is charged into the tank 11 and circulated through the ultrapure water production system 1 and the ultrapure water feed pipe system 2 by using the pump 12 as illustrated in FIG. 18 such that water discharged from the ultrapure water production system 1 is replaced with an alkaline solution having a pH of 9 or more. This alkali cleaning step is preferably conducted for 0.5 hr or more and is particularly preferably conducted for about 1 to 2 hr.

<FIG. 19: Flushing>

While the primary pure water 4 is fed into the tank 11, the second blow pipe 22a, which is branched from the pipe 22 at the end (downstream of a portion at which the pipe 22 merges with the bypass pipe 2a) of the pipe 22, is opened and the returned water is blown off to the outside of the system as illustrated in FIG. 19 in order to wash away the alkaline solution contained in the ultrapure water production system 1 and the ultrapure water feed pipe system 2 with the primary pure water 4 to the outside of the system, that is, perform flushing.

<FIGS. 20a to 20c: Sterilization Cleaning>

After wastewater resulting from flushing (water discharged through the blow pipe 22a) has been confirmed to have a pH of 8 or less and/or a resistivity of 10 MΩ·cm or more, sterilization cleaning of the inside of the ultrapure water production system 1 and the inside of the ultrapure water feed pipe system 2 by using sterilization water, which is illustrated in FIG. 20a, FIG. 20b, or FIG. 20c, is performed.

<FIG. 20a: Sterilization Cleaning Method 1>

Valve selection is made such that the ion-exchange device 15 of the ultrapure water production system 1 is bypassed; water is passed through both first microparticle removal membrane device 16 and bypass pipe 16e; sterilization water passed into a feedwater-side (primary side) portion of the membrane is discharged to the outside of the system through a concentrated-water pipe 16d without permeating through the membrane of the first microparticle removal membrane device 16; and water is passed through both pipe 20 and second microparticle removal membrane device 17 as illustrated in FIG. 20a. The water level in the tank 11 is adjusted accordingly. In the case where optional bypass pipes are disposed such that the heat exchanger 13 and the ultraviolet device 14 are bypassed, the lines are slightly opened.

The valve of the bypass pipe 2a of the ultrapure water feed pipe system 2 is slightly opened such that the sterilization water is also passed through the bypass pipe 2a. The blow pipe 16c is closed. Subsequently, heating is performed using the heat exchanger 13 as needed until the required temperature is reached and hydrogen peroxide is charged into the tank 11 and circulated in the ultrapure water production system 1 and the ultrapure water feed pipe system 2 by using pump 12 in order to replace the ultrapure water contained in the ultrapure water production system 1 and the ultrapure water feed pipe system 2 with the sterilization water.

In this sterilization cleaning step, the sterilization water does not permeate through the first microparticle removal membrane device 16 and only the feedwater-side portion of the membrane is subjected to sterilization cleaning. However, the sterilization water fed into the feedwater-side portion of the membrane percolates to a secondary-side (permeation side) portion of the membrane, and thereby the secondary-side (permeation side) portion of the membrane can be sterilized.

<FIG. 20b: Sterilization Cleaning Method 2>

Valve selection is made such that the ion-exchange device 15 and the first microparticle removal membrane device 16 of the ultrapure water production system 1 are bypassed; and water is passed through the pipe 20 and the second microparticle removal membrane device 17 as illustrated in FIG. 20b. The water level in the tank 11 is adjusted accordingly. In the case where optional bypass pipes are disposed such that the heat exchanger 13 and the ultraviolet device 14 are bypassed, the lines are slightly opened. The valve of the bypass pipe 2a of the ultrapure water feed pipe system 2 is slightly opened such that the sterilization water is also passed through the bypass pipe 2a. The blow pipe 16c is closed. Subsequently, heating is performed using the heat exchanger 13 as needed until the required temperature is reached and hydrogen peroxide is charged into the tank 11 and circulated in the ultrapure water production system 1 and the ultrapure water feed pipe system 2 by using pump 12 in order to replace the ultrapure water contained in the ultrapure water production system 1 and the ultrapure water feed pipe system 2 with the sterilization water.

<FIG. 20c: Sterilization Cleaning Method 3>

After the microparticle removal membrane of the first microparticle removal membrane device 16 has been replaced with a pipe, valve selection is made such that the ion-exchange device 15 of the ultrapure water production system 1 is bypassed; water is passed through the first microparticle removal membrane device 16; and water is passed through both pipe 20 and second microparticle removal membrane device 17 as illustrated in FIG. 20c. The water level in the tank 11 is adjusted accordingly. In the case where optional bypass pipes are disposed such that the heat exchanger 13 and the ultraviolet device 14 are bypassed, the lines are slightly opened. The valve of the bypass pipe 2a of the ultrapure water feed pipe system 2 is slightly opened such that the sterilization water is also passed through the bypass pipe 2a. The blow pipe 16c is closed. Subsequently, heating is performed using the heat exchanger 13 as needed until the required temperature is reached and hydrogen peroxide is charged into the tank 11 and circulated in the ultrapure water production system 1 and the ultrapure water feed pipe system 2 by using pump 12 in order to replace the ultrapure water contained in the ultrapure water production system 1 and the ultrapure water feed pipe system 2 with the sterilization water.

Sterilization cleaning in accordance with any one of the above sterilization cleaning methods 1 to 3 is preferably performed for 0.5 hr or more and is particularly preferably performed for 1 to 2 hr.

<FIG. 20d to 20f: Flushing>

While the primary pure water 4 is fed into the tank 11, the second blow pipe 22a branched from the pipe 22 at the end (downstream of the point at which the pipe 22 merges with the bypass pipe 2a) of the pipe 22 is opened in order to wash away the sterilization water contained in the ultrapure water production system 1 and the ultrapure water feed pipe system 2 with the primary pure water 4 to the outside of the system as illustrated in FIG. 20d in the case where the sterilization cleaning method 1 illustrated in FIG. 20a is employed, as illustrated in FIG. 20e in the case where the sterilization cleaning method 2 illustrated in FIG. 20b is employed, or as illustrated in FIG. 20f in the case where the sterilization cleaning method 3 illustrated in FIG. 20c is employed. This flushing step is conducted until the concentration of hydrogen peroxide in flush water discharged through the blow pipe 22a reaches 1 mg/L or less.

In the case where the sterilization cleaning method 2 illustrated in FIG. 20b is employed, subsequent to the above-described flushing cleaning step, the microparticle removal membrane of the first microparticle removal membrane device 16 is replaced with a sterilized microparticle removal membrane. The replacement of the membrane may be performed prior to sterilization and flushing cleaning. In the case where the sterilization cleaning method 3 illustrated in FIG. 20c is employed, subsequent to the above-described flushing cleaning step, the pipe of the first microparticle removal membrane device 16 is replaced with a sterilized microparticle removal membrane.

<FIG. 18: Second Alkali Cleaning>

After the termination of flushing, alkali cleaning (second alkali cleaning) is again performed as illustrated in FIG. 18. This cleaning step is conducted in the same manner as in first alkali cleaning.

<FIG. 19: Flushing>

Subsequent to second alkali cleaning, flushing is performed as illustrated in FIG. 19. This flushing step is conducted as in the above-described flushing step.

<FIG. 21 and FIGS. 20a to 20c: Second Sterilization Cleaning>

After the termination of the flushing step above, second sterilization cleaning is performed using hydrogen peroxide. In the first half of this second sterilization cleaning step, water is passed through the systems as illustrated in FIG. 21.

The water-passing method illustrated in FIG. 21 is basically the same as those illustrated in FIGS. 20a to 20c, but differs from those illustrated in FIGS. 20a to 20c in that water containing hydrogen peroxide passed through the bypass pipe 15a is passed through not only the bypass pipe

16e but also the first microparticle removal membrane device 16. The other water-passing conditions are the same as in FIGS. 20a to 20c. The sterilization cleaning step illustrated in FIG. 21 is preferably conducted for 0.5 hr or more and is particularly preferably conducted for about 0.5 to 1 hr.

After the termination of the sterilization cleaning step illustrated in FIG. 21, the sterilization cleaning step illustrated in FIGS. 20a to 20c is conducted. The sterilization cleaning step illustrated in FIGS. 20a to 20c is preferably conducted for 1 to 24 hr and is particularly preferably conducted for about 2 to 12 hr.

<FIG. 19: Flushing>

Flushing is performed by the method illustrated in FIG. 19. Water-passing conditions under which this flushing step is conducted are the same as in the above-described flushing step.

<FIG. 22: First Finishing>

First finishing water-passing illustrated in FIG. 22 is performed. The first finishing water-passing step is substantially the same as the flushing water-passing step illustrated in FIG. 19, but differs from the flushing step illustrated in FIG. 19 in that water discharged from the ultraviolet device 14 is passed through not only the bypass pipe 15a but also the ion-exchange device 15. The other conditions are the same as in the flushing step illustrated in FIG. 19.

<Second Finishing>

The second finishing water-passing step illustrated in FIG. 23 is conducted. The second finishing water-passing step is different from the first finishing water-passing step illustrated in FIG. 22 in the following respects 1) to 3). The other conditions are the same as in the first finishing water-passing step.

1) Water discharged from the ultraviolet oxidation device 14 is not passed through the bypass pipe 15a and is passed through only the ion-exchange device 15.

2) Water discharged from the ion-exchange device 15 is passed through only the first microparticle removal membrane device 16 and is not passed through the second microparticle removal membrane device 17.

3) Water discharged from the microparticle removal membrane device 16 is not passed to the use point 3, and the whole amount of water discharged from the microparticle removal membrane device 16 is passed through the bypass pipe 2a.

The second finishing water-passing step is conducted until the quality of water discharged through the blow pipe 22a reaches the targeted quality of ultrapure water. After the termination of second finishing water-passing, the system is returned to the steady-state operation.

Exemplary embodiments of the present invention are described above, and cleaning may be performed by a process other than the above-described cleaning process.

For example, alkali cleaning may be performed once or three times or more. The sterilization cleaning step may be conducted after alkali cleaning has been performed plural times with a flushing step performed subsequent to each alkali cleaning step.

The alkali cleaning step may be replaced with an acid cleaning step by using an acidic chemical instead of an alkaline chemical through the same process as in the alkali cleaning step. In another case, the alkali cleaning step and the acid cleaning step may be conducted alternately.

The above-described cleaning process is a cleaning method suitably employed in the case where an ultrapure water production system and an ultrapure water production feed system are newly constructed. In the regular maintenance of an ultrapure water production system and an ultrapure water production feed system that are in service, it is not always necessary to conduct the whole series of the cleaning steps described above. For example, it is possible to omit an alkali cleaning step and the subsequent flushing step, the first sterilization cleaning step and the subsequent flushing step, and the second alkali cleaning step and the subsequent flushing step and conduct, after precleaning, only the second sterilization cleaning step and the subsequent flushing and the first and second finishing cleaning steps.

In the present invention, the first microparticle removal membrane device and the second microparticle removal membrane device may include a plurality of microparticle removal membranes arranged in parallel. The second microparticle removal membrane device, which is used in the cleaning step but not used in the process for producing ultrapure water, may include a smaller number of microparticle removal membranes than the first microparticle removal membrane device.

The number of the microparticle removal membranes included in each microparticle removal membrane device varies depending on the amount of ultrapure water produced in the ultrapure water production system. It is suitable to set the number of microparticle removal membranes included in the second microparticle removal membrane device to about ½ or less the number of microparticle removal membranes included in the first microparticle removal membrane device.

The alkaline solution used for alkali cleaning in the present invention is preferably prepared by dissolving one or more basic compounds selected from the group consisting of ammonia, ammonium compounds, hydroxides of alkali metals, and oxides of alkali metals in ultrapure water and is particularly preferably prepared by dissolving a tetraalkylammonium compound in ultrapure water.

Water used for preparing a wash solution and water used for performing flushing are preferably desalted water and are more preferably primary pure water or ultrapure water.

The sterilization water used for sterilization cleaning in the present invention is sterilization water that does not contain a large amount of metallic impurities and does not cause corrosion. Examples of such sterilization water include oxidizer-containing water such as hydrogen peroxide water and ozone water, organic solutions such as an isopropyl alcohol solution and an ethanol solution, and hot water at about 40° C. to 85° C. Two or more types of sterilization water may be used in combination. An aqueous solution having a pH of 4 to 7, which is capable of serving as a sterilizer, is particularly preferably used. Specifically, any one of hydrogen peroxide water having a hydrogen peroxide concentration of 0.01 to 10 weight % at 10° C. to 50° C., ozone water having an ozone concentration of 1 to 50 mg/L at 10° C. to 40° C., and warm pure water that is primary pure water or ultrapure water at 60° C. or more is preferably used. Water used as the sterilization water is preferably desalted water and is more preferably primary pure water or ultrapure water.

The sterilized microparticle removal membrane, which is used in the sterilization cleaning methods 2 and 3 in the above-described sterilization cleaning step, may be prepared by performing sterilization cleaning by using the above sterilization water and subsequently replacing the sterilization water contained in the membrane with ultrapure water. The sterilization effect of the sterilized microparticle removal membrane may be reduced after a long period of time has elapsed since the sterilization water was replaced with ultrapure water. Disposing such a microparticle removal membrane in the ultrapure water production system may cause elution of microorganisms. Thus, it is preferable to use the microparticle removal membrane for replacing the membrane of the microparticle removal membrane device of the ultrapure water production system within 6 months and preferably within 3 months after the sterilization water has been replaced with ultrapure water.

In the sterilization cleaning method 1 and the subsequent flushing cleaning step described above, the amount of sterilization water or flush water passed through the second microparticle removal membrane device 17 and the bypass pipe of the first microparticle removal membrane device 16 and the amount of water fed into a feedwater-side portion of the first microparticle removal membrane device 16 are preferably controlled such that the first microparticle removal membrane device 16 is sterilized to a sufficient degree and a sufficient amount of sterilization water is passed through the pipes located downstream of the first microparticle removal membrane device 16. Accordingly, it is preferable to pass ½ or less the amount of sterilization water or flush water passed from the upstream side through the second microparticle removal membrane device 17 and the bypass pipe of the first microparticle removal membrane device 16 and feed the remaining part of the sterilization water or the flush water into the feedwater-side portion of the first microparticle removal membrane device 16.

For the same reason, in the sterilization cleaning method 3 and the subsequent flushing cleaning step described above, the ratio between the amount of water passed through the first microparticle removal membrane device 16 in which the microparticle removal membrane has been replaced with a pipe and the amount of water passed through the second microparticle removal membrane device 17 and the bypass pipe of the first microparticle removal membrane device 16 is preferably controlled such that ½ or more the amount of sterilization water or flush water passed from the upstream side through the second microparticle removal membrane device 17 and the bypass pipe of the first microparticle removal membrane device 16 and the remaining part of the sterilization water or the flush water through the first microparticle removal membrane device 16 in which the membrane has been replaced with a pipe.

EXAMPLES

The present invention is described more specifically with reference to Examples and Comparative examples below.

In Examples 1 and 2 and Comparative example 1 below, the cleaning method according to the present invention was applied to a newly constructed ultrapure water production system. After being cleaned, the system was started. Subsequently, the quality of ultrapure water which was measured at the water use point (use point) was evaluated in the following manner.

Number of microparticles: the number of microparticles having a diameter of 50 nm or more was measured using a microparticle meter ("UDI150" produced by PMS (measurement time: 10 minutes).

Metal (iron) concentration: the Fe concentration in the condensate of a sample was analyzed by ICP/MS at a frequency of once per day.

Number of microorganisms: the number of microorganisms was analyzed three days after the start-up of the system by a culture method at a frequency of once per day.

Example 1

The ultrapure water production system 1 and the ultrapure water feed pipe system 2 illustrated in FIG. 1 were cleaned by the above-described process in the order of FIG. 2→FIG. 3→FIG. 4→FIG. 5a→FIG. 5d→FIG. 3→FIG. 4→FIG. 6→FIG. 5a→FIG. 4→FIG. 7→FIG. 8.

In the steady-state operation, ultrapure water flowed through the pipe 21 at a flow rate of 0.75 m/sec (15 m³/hr).

<Precleaning>

Water was passed in accordance with the flow illustrated in FIG. 2 such that the flow rate of water passed through the pipe 21 was 13 m³/hr and the flow rate of water passed through the blow pipe 16c was 2 m³/hr.

After the resistivity of water discharged through the blow pipe 16c had reached 18 MΩ·cm or more, passing water through the second microparticle removal membrane device 17 was stopped, and a microparticle removal membrane was subsequently attached to the second microparticle removal membrane device 17.

<First Alkali Cleaning>

An ultraviolet lamp of the ultraviolet device 14 was turned off. An aqueous tetramethylammonium hydroxide solution having a concentration of 25 mg/L was charged into the tank 11 as illustrated in FIG. 3 such that a pH of 10.5 or more was achieved. An aqueous tetramethylammonium hydroxide solution was circulated in the ultrapure water production system 1 and the ultrapure water feed pipe system 2 for one hour in order to clean these systems. Water was not passed through either the ion-exchange device 15 or the microparticle removal membrane device 16, and the wash solution was diverted through the bypass pipes 15a, 16a, 16b, and 2a and the microparticle removal membrane device 17.

<Flushing>

In accordance with the flow illustrated in FIG. 4, wastewater resulting from cleaning was discharged through the blow pipe 22a, primary pure water 4 serving as flush water was fed into the tank 11, and the water was passed through the ultrapure water production system 1 and the ultrapure water feed pipe system 2 at a flow rate of 0.75 m/sec in order to wash away the wash solution remaining inside the systems, that is, perform flushing. Water was not passed through either the ion-exchange device 15 or the microparticle removal membrane device 16, and the flush water was diverted through the bypass pipes 15a, 16a, 16b, and 2a and the microparticle removal membrane device 17 as illustrated in FIG. 4.

The above-described flushing step was conducted for 1 hour and terminated when the pH of the flush water discharged through the blow pipe 22a reached 8.

<First Sterilization Cleaning>

The ultrapure water production system 1 and the ultrapure water feed pipe system 2 were sterilized in accordance with the flow illustrated in FIG. 5a.

After the lamp of the ultraviolet device 14 had been confirmed to be turned off, the temperature of water circulating in the ultrapure water production system 1 and the ultrapure water feed pipe system 2 at a flow rate of 0.75 m/sec was controlled to be 40° C. using the heat exchanger 13, and hydrogen peroxide was subsequently charged into the tank 11 at a concentration of 0.1 weight %. The hydrogen peroxide solution that served as sterilization water was circulated in the ultrapure water production system 1 and the ultrapure water feed pipe system 2 for one hour. In this step, water was not passed through the ion-exchange device 15, and the sterilization water was circulated through the bypass pipes 15a, 16a, 16b, and 2a and the microparticle removal membrane device 17.

Part (½ or less the amount of the sterilization water passed through the bypass pipe 15a) of the sterilization water was fed into a feedwater-side portion of the membrane and discharged to the outside of the system from a concentrated-water-side portion of the membrane.

<Flushing>

Flushing was performed in accordance with the flow illustrated in FIG. 5d. The sterilization solution was discharged through the blow pipe 22a, primary pure water 4 serving as flush water was fed into the tank 11, and the water was passed through the ultrapure water production system 1 and the ultrapure water feed pipe system 2 at a flow rate of 0.75 m/sec in order to wash away the sterilization water remaining inside the systems, that is, perform flushing. In this flushing step, part of the flush water was fed into the feedwater-side portion of the first microparticle removal membrane device 16 as in the first sterilization cleaning step described above.

The above flushing step was conducted for two hours and terminated when the hydrogen peroxide contained in the flush water discharged through the blow pipe 22a became undetectable with hydrogen peroxide test paper.

<Second Alkali Cleaning>

Alkali cleaning of the ultrapure water production system 1 and the ultrapure water feed pipe system 2 was again performed in accordance with the flow illustrated in FIG. 3.

After the lamp of the ultraviolet device 14 had been confirmed to be turned off, an aqueous tetramethylammonium hydroxide solution having a concentration of 25 mg/L was charged into the tank 11 of the ultrapure water production system 1, in which water was circulated at a flow rate of 0.75 m/sec, such that a pH of 10.5 or more was achieved. An aqueous tetramethylammonium hydroxide solution was circulated in the ultrapure water production system 1 and the ultrapure water feed pipe system 2 for two hours in order to clean these systems. Water was not passed through either the ion-exchange device 15 or the microparticle removal membrane device 16, and the wash solution was diverted through the bypass pipes 15a, 16a, 16b, and 2a and the microparticle removal membrane device 17.

<Flushing>

In accordance with the flow illustrated in FIG. 4, the wash solution was discharged through the blow pipe 22a, primary pure water 4 serving as flush water was fed into the tank 11, and the water was passed through the ultrapure water production system 1 and the ultrapure water feed pipe system 2 at a flow rate of 0.75 m/sec in order to wash away the wash solution remaining inside the systems, that is, perform flushing.

The above-described flushing step was conducted for 1 hour and terminated when the pH of the flush water discharged through the blow pipe reached 8.

<Second Sterilization Cleaning>

Second sterilization cleaning of the ultrapure water production system 1 and the ultrapure water feed pipe system 2 was performed in accordance with the flow illustrated in FIG. 6 and subsequently performed in accordance with the flow illustrated in FIG. 5a.

After the lamp of the ultraviolet device 14 had been confirmed to be turned off, the temperature of water circulating in the ultrapure water production system 1 and the ultrapure water feed pipe system 2 at a flow rate of 0.75 m/sec was controlled to be 40° C. using the heat exchanger 13, and hydrogen peroxide was subsequently charged into the tank 11 at a concentration of 0.1 weight % as illustrated in FIG. 6. The hydrogen peroxide solution that served as sterilization water was circulated in the ultrapure water production system 1 and the ultrapure water feed pipe system 2 for two hours. In this step, the water was not passed through the ion-exchange device 15, and the water was passed through both microparticle removal membrane devices 16 and 17 only for first 30 minutes.

Subsequently, the sterilization water was passed through the systems as illustrated in FIG. 5a.

<Flushing>

In accordance with the flow illustrated in FIG. 4, the wash water was discharged through the blow pipe 22a, primary pure water serving as flush water was fed into the tank 11, and the water was passed through the ultrapure water production system 1 and the ultrapure water feed pipe system 2 at a flow rate of 0.75 m/sec in order to wash away the wash water remaining inside the systems, that is, perform flushing.

The above flushing step was conducted for two hours and terminated when the hydrogen peroxide contained in the flush water discharged through the blow pipe 22a became undetectable using hydrogen peroxide test paper.

<First Finishing>

As illustrated in FIG. 7, while flush water was passed through the bypass pipes 15a, 16a, and 16b and the microparticle removal membrane device 17 such that the water was not passed through the microparticle removal membrane device 16, the water was passed through both ion-exchange device 15 and bypass pipe 15a, and wastewater was discharged through the blow pipe 22a.

<Second Finishing Cleaning>

One hour after the first finishing cleaning step had been started, passing water through the bypass pipe 15a was stopped, water treated in the ion-exchange device 15 was passed through the bypass pipes 16a and 16b and the microparticle removal membrane devices 16 and 17, and wastewater was discharged through the blow pipe 22a as illustrated in FIG. 8.

One hour after the second finishing cleaning step had been started, cleaning and sterilization of the ultrapure water production system 1 and the ultrapure water feed pipe system 2 were terminated. Subsequently, the systems were returned to the steady-state operation illustrated in FIG. 1.

The quality of ultrapure water measured at the water use point (use point) 3 was evaluated. The amount of time required to reduce the number of microparticles contained in ultrapure water to 100 particle/L or less after starting the systems was measured. The amount of time required to reduce the metal (Fe) concentration to 0.1 ng/L or less after starting the systems was measured. The amount of time required to reduce the number of microorganisms to 1 count/L or less after starting the systems was measured. Table 1 summarizes the results.

Example 2

The ultrapure water production system and the ultrapure water production feed system were cleaned as in Example 1, except that the sterilization cleaning step illustrated in FIG. 5a and the flushing step illustrated in FIG. 5d which were conducted in Example 1 were changed to the sterilization cleaning step illustrated in FIG. 5c and the flushing step illustrated in FIG. 5f, respectively.

In the sterilization cleaning step, after the microparticle removal membrane of the first microparticle removal membrane device 16 had been replaced with a pipe, ⅕ the amount of the sterilization water or the flush water passed through the bypass pipe 15a was passed through the first microparticle removal membrane device 16 to which the membrane was not attached, and the remaining part of the sterilization water or the flush water was passed through the second microparticle removal membrane device 17 in order to perform cleaning. The sterilized microparticle removal membrane used was a microparticle removal membrane that had been stored for 3 months after being sterilized by being immersed in hydrogen peroxide water having a concentration of 1 weight % for 2 hours and the sterilization water was subsequently replaced with ultrapure water.

The quality of ultrapure water which was measured after the system had been started was evaluated as in Example 1. Table 1 summarizes the results.

Comparative Example 1

The ultrapure water production system and the ultrapure water production feed system were cleaned as in Example 1, except that water was not passed through the second microparticle removal membrane device but was passed through only the first microparticle removal membrane device in the precleaning step, the alkali cleaning step, the first finishing step, the second finishing step, the sterilization cleaning step, and the flushing step. The quality of ultrapure water which was measured after the system had been started was evaluated as in Example 1. Table 1 summarizes the results.

Comparative Example 2

The ultrapure water production system and the ultrapure water production feed system were cleaned as in Example 1, except that, an additional pipe was disposed such that the first microparticle removal membrane device was bypassed; water was passed through the bypass pipe instead of the second microparticle removal membrane device in the precleaning step, the alkali cleaning step, the first finishing step, the second finishing step, the sterilization cleaning step, and the flushing step; and the sterilization water, the flush water, or the like passed through the bypass pipe 15a was passed through the additional bypass pipe. The quality of ultrapure water which was measured after the system had been started was evaluated as in Example 1. Table 1 summarizes the results.

TABLE 1

|  | Example 1 | Example 2 | Comparative example 1 | Comparative example 2 |
|---|---|---|---|---|
| Amount of time (day) required to satisfy Number of Microparticles Contained in Ultrapure Water ≤100 Particle/L | 7 | 7 | 30 | 7 |
| Amount of time (day) required to satisfy Concentration of Metals (Fe) in Ultrapure Water ≤0.1 ng/L | 7 | 7 | 7 | 30 |
| Amount of time (day) required to satisfy Number of Microorganisms Contained in Ultrapure Water ≤1 Count/L | 3 | 3 | 3 | 3 |

The results summarized in Table 1 confirm that, according to the present invention, ultrapure water having high quality became available at the water use point within a short period of time after sterilization cleaning had been performed.

Example 3

The ultrapure water production system 1 and the ultrapure water feed pipe system 2 illustrated in FIG. 1 were cleaned by the above-described process in the order of FIG. 2→FIG. 3→FIG. 4→FIG. 5b→FIG. 5e→FIG. 3→FIG. 4→FIG. 6→FIG. 5b→FIG. 4→FIG. 7→FIG. 8.

In the steady-state operation, ultrapure water flowed through the pipe 21 at a flow rate of 0.75 m/sec (15 m$_3$/hr).

<Precleaning>

Water was passed in accordance with the flow illustrated in FIG. 2 such that the flow rate of water passed through the pipe 21 was 13 m$^3$/hr and the flow rate of water passed through the blow pipe 16c was 2 m$^3$/hr. After the resistivity of water discharged through the blow pipe 16c had reached 18 MΩ·cm or more, passing water through the second microparticle removal membrane device 17 was stopped, and a microparticle removal membrane was subsequently attached to the second microparticle removal membrane device 17.

<First Alkali Cleaning>

An ultraviolet lamp of the ultraviolet device 14 was turned off. An aqueous tetramethylammonium hydroxide solution having a concentration of 25 mg/L was charged into the tank 11 as illustrated in FIG. 3 such that a pH of 10.5 or more was achieved. An aqueous tetramethylammonium hydroxide solution was circulated in the ultrapure water production system 1 and the ultrapure water feed pipe system 2 for one hour in order to clean these systems. Water was not passed through either the ion-exchange device 15 or the microparticle removal membrane device 16, and the wash solution was diverted through the bypass pipes 15a, 16a, 16b, and 2a and the microparticle removal membrane device 17.

<Flushing>

In accordance with the flow illustrated in FIG. 4, wastewater resulting from cleaning was discharged through the blow pipe 22a, primary pure water 4 serving as flush water was fed into the tank 11, and the water was passed through the ultrapure water production system 1 and the ultrapure water feed pipe system 2 at a flow rate of 0.75 m/sec in order to wash away the wash solution remaining inside the systems, that is, perform flushing. Water was not passed through either the ion-exchange device 15 or the microparticle removal membrane device 16, and the flush water was diverted through the bypass pipes 15a, 16a, 16b, and 2a and the microparticle removal membrane device 17 as illustrated in FIG. 4.

The above-described flushing step was conducted for 1 hour and terminated when the pH of the flush water discharged through the blow pipe 22a reached 8.

<First Sterilization Cleaning>

The ultrapure water production system 1 and the ultrapure water feed pipe system 2 were sterilized in accordance with the flow illustrated in FIG. 5b.

After the lamp of the ultraviolet device 14 had been confirmed to be turned off, the temperature of water circulating in the ultrapure water production system 1 and the ultrapure water feed pipe system 2 at a flow rate of 0.75 m/sec was controlled to be 40° C. using the heat exchanger 13, and hydrogen peroxide was subsequently charged into the tank 11 at a concentration of 0.1 weight %. The hydrogen peroxide solution was circulated in the ultrapure water production system 1 and the ultrapure water feed pipe system 2 for one hour. In this step, water was not passed through either the ion-exchange device 15 or the microparticle removal membrane device 16, and the sterilization water was circulated through the bypass pipes 15a, 16a, 16b, and 2a and the microparticle removal membrane device 17.

\<Flushing\>

Flushing was performed in accordance with the flow illustrated in FIG. 5e. The sterilization solution was discharged through the blow pipe 22a, primary pure water 4 serving as flush water was fed into the tank 11, and the water was passed through the ultrapure water production system 1 and the ultrapure water feed pipe system 2 at a flow rate of 0.75 m/sec in order to wash away the wash water remaining inside the systems, that is, perform flushing.

The above flushing step was conducted for two hours and terminated when the hydrogen peroxide contained in the flush water discharged through the blow pipe 22a became undetectable using hydrogen peroxide test paper.

\<Second Alkali Cleaning\>

Alkali cleaning of the ultrapure water production system 1 and the ultrapure water feed pipe system 2 was again performed in accordance with the flow illustrated in FIG. 3.

After the lamp of the ultraviolet device 14 had been confirmed to be turned off, an aqueous tetramethylammonium hydroxide solution having a concentration of 25 mg/L was charged into the tank 11 of the ultrapure water production system 1, in which water was circulated at a flow rate of 0.75 m/sec, such that a pH of 10.5 or more was achieved. An aqueous tetramethylammonium hydroxide solution was circulated in the ultrapure water production system 1 and the ultrapure water feed pipe system 2 for two hours in order to clean these systems. Water was not passed through either the ion-exchange device 15 or the microparticle removal membrane device 16, and the wash solution was diverted through the bypass pipes 15a, 16a, 16b, and 2a and the microparticle removal membrane device 17.

\<Flushing\>

In accordance with the flow illustrated in FIG. 4, the wash solution was discharged through the blow pipe 22a, primary pure water 4 serving as flush water was fed into the tank 11, and the water was passed through the ultrapure water production system 1 and the ultrapure water feed pipe system 2 at a flow rate of 0.75 m/sec in order to wash away the wash solution remaining inside the systems, that is, perform flushing.

The above-described flushing step was conducted for 1 hour and terminated when the pH of the flush water discharged through the blow pipe reached 8.

\<Second Sterilization Cleaning\>

Second sterilization cleaning of the ultrapure water production system 1 and the ultrapure water feed pipe system 2 was performed in accordance with the flow illustrated in FIG. 6 and subsequently performed in accordance with the flow illustrated in FIG. 5b.

After the lamp of the ultraviolet device 14 had been confirmed to be turned off, the temperature of water circulating in the ultrapure water production system 1 and the ultrapure water feed pipe system 2 at a flow rate of 0.75 m/sec was controlled to be 40° C. using the heat exchanger 13, and hydrogen peroxide was subsequently charged into the tank 11 at a concentration of 0.1 weight % as illustrated in FIG. 6. The hydrogen peroxide solution that served as sterilization water was circulated in the ultrapure water production system 1 and the ultrapure water feed pipe system 2 for two hours. In this step, water was not passed through the ion-exchange device 15, and the water was passed through both microparticle removal membrane devices 16 and 17 only for first 30 minutes.

Subsequently, passing water through the microparticle removal membrane device 16 was stopped, and the sterilization solution was passed through the bypass pipes 15a, 16a, and 16b and the microparticle removal membrane device 17 as illustrated in FIG. 5b.

\<Flushing\>

In accordance with the flow illustrated in FIG. 4, the wash solution was discharged through the blow pipe 22a, primary pure water serving as flush water was fed into the tank 11, and the water was passed through the ultrapure water production system 1 and the ultrapure water feed pipe system 2 at a flow rate of 0.75 m/sec in order to wash away the wash solution remaining inside the systems, that is, perform flushing.

The above flushing step was conducted for two hours and terminated when the hydrogen peroxide contained in the flush water discharged through the blow pipe 22a became undetectable using hydrogen peroxide test paper.

\<First Finishing\>

As illustrated in FIG. 7, while flush water was passed through the bypass pipes 15a, 16a, and 16b and the microparticle removal membrane device 17 such that the water was not passed through the microparticle removal membrane device 16, the water was passed through both ion-exchange device 15 and bypass pipe 15a, and wastewater was discharged through the blow pipe 22a.

\<Second Finishing Cleaning\>

One hour after the first finishing cleaning step had been started, passing water through the bypass pipe 15a was stopped, water treated in the ion-exchange device 15 was passed through the bypass pipes 16a and 16b and the microparticle removal membrane devices 16 and 17, and wastewater was discharged through the blow pipe 22a as illustrated in FIG. 8.

One hour after the second finishing cleaning step had been started, cleaning and sterilization of the ultrapure water production system 1 and the ultrapure water feed pipe system 2 were terminated. Subsequently, the systems were returned to the steady-state operation illustrated in FIG. 1.

Subsequently, the number of microparticles having a φ of 50 nm or more contained in the ultrapure water was measured at the water use point (use point) 3 by using a light-scattering microparticle monitor. The relationship between the amount of time elapsed and the number of microparticles contained in the ultrapure water was examined. Table 2 summarizes the results.

Comparative Example 3

The ultrapure water production system and the ultrapure water production feed system were cleaned as in Example 3, except that, an additional pipe was disposed such that the first microparticle removal membrane device was bypassed; water was passed through the bypass pipe instead of the second microparticle removal membrane device in the pre-cleaning step, the alkali cleaning step, the first finishing step, the second finishing step, the sterilization cleaning step, and the flushing step; and the sterilization water, the flush water, or the like passed through the bypass pipe 15a was passed through the additional bypass pipe. The quality of ultrapure water which was measured after the system had been started was evaluated as in Example 3. Table 2 summarizes the results.

Example 4

The ultrapure water production system 1 and the ultrapure water feed pipe system 2 illustrated in FIGS. 9 to 15 were subjected to sterilization cleaning by the above-described process in the order of FIG. 9→FIG. 10→FIG. 11→FIG.

12b→FIG. 12e→FIG. 10→FIG. 11→FIG. 13→FIG. 12b→FIG. 11→FIG. 14→FIG. 15.

Precleaning was performed in accordance with the flow illustrated in FIG. 9. The flow rate of water passed through the pipe 21 was 13 m³/hr. The flow rate of water passed through the blow pipe 16c was 2 m³/hr. The other conditions were the same as the case illustrated in FIG. 2.

FIG. 10 illustrates an alkali cleaning step substantially the same as that illustrated in FIG. 3. In FIG. 10, the whole amount of water passed from the ultraviolet device 14 is passed through the bypass pipe 15c, the second microparticle removal membrane device 17, and the bypass pipes 15d, 16a, and 16b, and water is not passed through the first microparticle removal membrane device 16. The other conditions of the alkali cleaning step illustrated in FIG. 10 are the same as in that conducted in Example 3 which is illustrated in FIG. 3.

FIG. 11 illustrates a flushing step similar to that illustrated in FIG. 4. In FIG. 11, the whole amount of water passed from the ultraviolet device 14 is passed through the bypass pipe 15c, the microparticle removal membrane device 17, and the bypass pipes 15d, 16a, and 16b, and water is not passed through the microparticle removal membrane device 16. The other conditions of the flushing step are the same as in that conducted in Example 3 which is illustrated in FIG. 4.

FIG. 12b illustrates a first sterilization cleaning step and a second sterilization cleaning step (second half) similar to the sterilization cleaning step illustrated in FIG. 5b. In FIG. 12b, the whole amount of water passed from the ultraviolet device 14 is passed through the bypass pipe 15c, the microparticle removal membrane device 17, and the bypass pipes 15d, 16a, and 16b, and water is not passed through the microparticle removal membrane device 16. The other conditions of the sterilization cleaning step are the same as in that conducted in Example 3 which is illustrated in FIG. 5b.

FIG. 12e illustrates a flushing step similar to that illustrated in FIG. 5e. In FIG. 12e, the whole amount of water passed from the ultraviolet device 14 is passed through the bypass pipe 15c, the microparticle removal membrane device 17, and the bypass pipes 15d, 16a, and 16b, and water is not passed through the microparticle removal membrane device 16. The other conditions of the flushing step are the same as in that conducted in Example 3 which is illustrated in FIG. 5e.

FIG. 13 illustrates the flow of the first half of the second sterilization cleaning step. The sterilization cleaning step illustrated in FIG. 13 is different from that illustrated in FIG. 12b in that, in the sterilization cleaning step illustrated in FIG. 13, the sterilization wash water passed from the ultraviolet device 14 is not passed through the ion-exchange device 15 and water is passed through the microparticle removal membrane device 16 only for first 30 minutes. The other conditions of the sterilization cleaning step are the same as in that illustrated in FIG. 12b.

FIG. 14 illustrates a first finishing step similar to that illustrated in FIG. 7. FIG. 15 illustrates a second finishing step similar to that illustrated in FIG. 8. In FIG. 14, water passed through the ultraviolet device 14 is passed through both ion-exchange device 15 and second microparticle removal membrane device 17. The merged water is passed through only the bypass pipes 16a and 16b and is not passed through the first microparticle removal membrane device 16.

In FIG. 15, water passed through the ultraviolet device 14 is passed through the ion-exchange device 15 and the first microparticle removal membrane device 16, but not passed through either the bypass pipes 15c and 15d or the second microparticle removal membrane device 17. The other water-passing conditions of the finishing steps illustrated in FIGS. 14 and 15 are the same as in the finishing steps of Example 3 which are illustrated in FIGS. 7 and 8, respectively.

The ultrapure water production system 1 and the ultrapure water feed pipe system 2 were cleaned and sterilized in the above-described manner. Subsequently, after the steady-state operation had been restarted, the number of microparticles having a ϕ of 50 nm or more contained in the ultrapure water was measured at the water use point (use point) 3 by using a light-scattering microparticle monitor. The relationship between the amount of time elapsed and the number of microparticles contained in the ultrapure water was examined. Table 2 summarizes the results.

TABLE 2

| | Example 3 | Comparative example 3 | Example 4 |
|---|---|---|---|
| Amount of time (day) required to reduce the number of microparticles having a diameter of 50 nm or more which were contained in ultrapure water to 500 particle/L or less after restarting the steady-state operation | 3 | 6 | 4 |

As is clear from the comparison between the results of Example 3 and Comparative Example 3 summarized in Table 2, passing water through the second microparticle removal membrane device 17 disposed parallel to the first microparticle removal membrane device 16 as in Example 3 enabled the number of microparticles having a ϕ of 50 nm or more which were contained in ultrapure water at the water use point (use point) 3 in the ultrapure water feed pipe system 2 to reach 500 particle/L or less in 3 days after the ultrapure water production system 1 and the ultrapure water feed pipe system 2 had been cleaned and sterilized, which was 3 days early compared with Comparative Example 3, where a method of the related art was simulated.

This is presumably because microparticles generated from a sliding portion of the pump 12 of the ultrapure water production system 1 in the cleaning and sterilization step contaminated the ultrapure water feed pipe system 2. Thus, the number of microparticles having a ϕ of 50 nm or more was measured at the outlet of the pump 12 of the ultrapure water production system 1 during the production of ultrapure water by using a light-scattering microparticle monitor. As a result, it was confirmed that about 10,000 to 20,000 particle/L of microparticles were constantly discharged.

Passing water through the second microparticle removal membrane device 17 disposed parallel to the ion-exchange device 15 as in Example 4 enabled the number of microparticles having a ϕ of 50 nm or more which were contained in ultrapure water at the water use point (use point) 3 in the ultrapure water feed pipe system 2 to reach 500 particle/L or less in 4 days after the ultrapure water production system 1 and the ultrapure water feed pipe system 2 had been cleaned and sterilized, which was 2 days early compared with Comparative Example 3, where a method of the related art was simulated.

While an example case where the second microparticle removal membrane device is interposed between a final pump of the ultrapure water production system and the first microparticle removal membrane device is described in embodiments above, an ultrapure water production system 1 and an ultrapure water feed pipe system 2 (FIGS. 16 to 23)

in which the second microparticle removal membrane device is disposed downstream of the first microparticle removal membrane device may also have the same advantageous effects when water can be passed through the ultrapure water production system 1 and the ultrapure water feed pipe system 2 in the same manner as in the above-described embodiments by switching valves and the like.

Although the present invention has been described in detail with reference to particular embodiments, it is apparent to a person skilled in the art that various modifications can be made therein without departing from the spirit and scope of the present invention.

The present application is based on Japanese Patent Application Nos. 2013-083233, 2013-113027, and 2013-153640, which are incorporated herein by reference in their entirety.

The invention claimed is:

1. A method for cleaning an ultrapure water production feed system including an ultrapure water production system including a tank, a pump, a heat exchanger, an ultraviolet device, an ion-exchange device, and a first microparticle removal membrane device; a feed pipe through which ultrapure water produced in the ultrapure water production system in a predetermined amount of time is fed to a water use point; and a return pipe through which excess water passed from the water use point is returned to the ultrapure water production system, the method comprising:
attaching a microparticle removal membrane to the first microparticle removal membrane device through which sterilization water and flushing water are passed and permeated, thereby producing a permeated water and cleaning the feed pipe and the return pipe by the permeated water; and passing the sterilization water and the flushing water through the tank, the pump, the heat exchanger, the ultraviolet device, the ion-exchange device, and the first microparticle removal membrane device without passing the sterilization water and the flushing water through the first microparticle removal membrane device; and conducting any one of cleaning steps described in (IV-1) to (IV-3);

(IV-1) the sterilization water or the flush water is fed into the first microparticle removal membrane device and discharged from a feedwater-side potion of the first microparticle removal membrane device to a concentrated-water-side portion of the first microparticle removal membrane device without permeating through the microparticle removal membrane included in the first microparticle removal membrane device, and the remaining part of the sterilization water or the flush water is passed through the second microparticle removal membrane device, or (IV-2) a whole amount of the sterilization water or the flush water is passed through the second microparticle removal membrane device, and the microparticle removal membrane of the first microparticle removal membrane device is replaced with a sterilized microparticle removal membrane, or (IV-3) after the microparticle removal membrane of the first microparticle removal membrane device is replaced with a pipe, the sterilization water or the flush water is passed through the first microparticle removal membrane device, the remaining part of the sterilization water or the flush water is passed through the second microparticle removal membrane device, and the pipe of the first microparticle removal membrane device is subsequently replaced with a sterilized microparticle removal membrane; and passing water through the heat exchanger, the ultraviolet device, the ion-exchange device, and the first microparticle removal membrane device without passing the water through the second microparticle removal membrane device in order to produce ultrapure water, wherein sterilization water or flush water that permeated through the second microparticle removal membrane device is passed through the feed pipe and the return pipe and subsequently discharged to an outside of the ultrapure water production feed system and the ultrapure water production system.

2. An ultrapure water production feed system, comprising:
an ultrapure water production system comprising:
a tank,
a pump,
a heat exchanger,
an ultraviolet device,
an ion-exchange device, and
a first microparticle removal membrane device;
a second microparticle removal membrane device disposed parallel to the first microparticle removal membrane device;
a feed pipe supplying ultrapure water produced in the ultrapure water production system in a predetermined amount of time to a water use point;
a return pipe returning excess water from the water use point to the ultrapure water production system;
a first blow pipe through which water passed through the second microparticle removal membrane device is discharged to an outside of the ultrapure water production system before merging with water passed through the first microparticle removal membrane device; and
a channel-switch device switching such that water passes through only the first microparticle removal membrane device, through only the second microparticle removal membrane device, or through both the first microparticle removal membrane device and the second microparticle removal membrane device,
wherein, when ultrapure water is produced, the water passes through only the first microparticle removal membrane device, and
when the water production feed system including the feed pipe and the return pipe is cleaned by sterilization cleaning and flushing cleaning, the water passes through only the second microparticle removal membrane device, or through both the first microparticle removal membrane device and the second microparticle removal membrane device.

3. The ultrapure water production feed system according to claim 2, further comprising a second blow pipe branched from the return pipe.

4. An ultrapure water production feed system, comprising:
an ultrapure water production system comprising
a tank,
a pump,
a heat exchanger,
an ultraviolet device,
an ion-exchange device, and
a first microparticle removal membrane device;
a second microparticle removal membrane device disposed parallel to the ion-exchange device and interposed between a final pump of the ultrapure water production system and the first microparticle removal membrane device such that water is diverted from the second microparticle removal membrane device;
a feed pipe supplying ultrapure water produced in the ultrapure water production system in a predetermined amount of time to a water use point;
a return pipe returning excess water from the water use point to the ultrapure water production system;
a bypass pipe branching the first microparticle removal membrane device;
a channel-switch device switching such that the water passes through only the first microparticle removal membrane device, through only the bypass pipe branching the first microparticle removal membrane device, or through both the first microparticle removal membrane device and the bypass pipe branching the first microparticle removal membrane device; and
another channel-switch device switching such that the water is passed through only the ion-exchange device, through only the second microparticle removal membrane device, or through both the ion-exchange device and the second microparticle removal membrane device.,
wherein, when ultrapure water is produced, the water bypasses the second microparticle removal membrane device and the water passes through only the first microparticle removal membrane device, and
when the water production feed system including the feed pipe and the return pipe is cleaned by sterilization cleaning and flushing cleaning, the water passes through the second microparticle removal membrane device and such that the water passes through only the bypass pipe branching the first microparticle removal membrane device, or the water passes through both the first microparticle removal membrane device and the bypass pipe branching the first microparticle removal membrane device.

5. The ultrapure water production feed system according to claim 4, further comprising a first blow pipe through which the water passed through the second microparticle removal membrane device is discharged to an outside of the ultrapure water production system before merging with water passed through the ion-exchange device.

6. A method for cleaning an ultrapure water production system including
a tank,
a pump,
a heat exchanger,
an ultraviolet device,
an ion-exchange device, and
a first microparticle removal membrane device,
a feed pipe supplying ultrapure water produced in the ultrapure water production system to a water use point, and
a return pipe returning excess water from the water use point to the ultrapure water production system,
the method comprising:
attaching a microparticle removal membrane to the ultrapure water production system;
passing and permeating sterilization water and flushing water through the microparticle removal membrane, thereby producing a permeated water and cleaning the feed pipe and the return pipe by the permeated water; and
passing pure water through the tank, the pump, the heat exchanger, the ultraviolet device, the ion-exchange device, and the first microparticle removal membrane device, thereby producing ultrapure water,
wherein, when the ultrapure water is produced, the pure water is not passed through the microparticle removal membrane through which the sterilization water and the flushing water are passed.

7. The method for cleaning an ultrapure water production system according to claim 6, wherein the ultrapure water production system further includes a second microparticle removal membrane device disposed parallel to the first microparticle removal membrane device, and
the method further comprises
conducting any one of cleaning steps described in (I-1) to (I-3);
(I-1) the sterilization water or the flush water is fed into the first microparticle removal membrane device and discharged from a feedwater-side potion of the first microparticle removal membrane device to a concentrated-water-side portion of the first microparticle removal membrane device without permeating through a microparticle removal membrane included in the first microparticle removal membrane device, and
the remaining part of the sterilization water or the flush water is passed through the second microparticle removal membrane device, or
(I-2) a whole amount of the sterilization water or the flush water is passed through the second microparticle removal membrane device, and
the microparticle removal membrane of the first microparticle removal membrane device is replaced with a sterilized microparticle removal membrane, or
(I-3) after the microparticle removal membrane of the first microparticle removal membrane device is replaced with a pipe,
the sterilization water or the flush water is passed through the first microparticle removal membrane device,
the remaining part of the sterilization water or the flush water is passed through the second microparticle removal membrane device, and
the pipe of the first microparticle removal membrane device is subsequently replaced with a sterilized microparticle removal membrane; and
passing water through the heat exchanger, the ultraviolet device, the ion-exchange device, and the first microparticle removal membrane device without passing the water through the second microparticle removal membrane device in order to produce ultrapure water.

8. The method for cleaning an ultrapure water production system according to claim 6, wherein the ultrapure water production system further includes a second microparticle removal membrane device interposed between a final pump of the ultrapure water production system and the first microparticle removal membrane device such that water is diverted from the second microparticle removal membrane device, and
the method further comprises
conducting any one of cleaning steps described in (II-1) to (II-3);
(II-1) after a first bypass pipe has been disposed such that the first microparticle removal membrane device is bypassed,
the sterilization water or the flush water is passed through the second microparticle removal membrane device,
part of water that permeated through the second microparticle removal membrane device is fed into the first microparticle removal membrane device and discharged from a feedwater-side portion of the first microparticle removal membrane device to a concentrated-water-side portion of the first microparticle removal membrane device without permeating through a microparticle removal membrane included in the first microparticle removal membrane device, and the remaining part of the water passed through the second microparticle removal membrane device is passed through the first bypass pipe, or (II-2) after a first bypass pipe has been disposed such that the first microparticle removal membrane device is bypassed, the sterilization water or the flush water is passed through the second microparticle removal membrane device and the first bypass pipe, and the microparticle removal membrane of the first microparticle removal membrane device is replaced with a sterilized microparticle removal membrane, or (II-3) after the microparticle removal membrane of the first microparticle removal membrane device has been replaced with a pipe, the sterilization water or the flush water is passed through the second microparticle removal membrane device and the first microparticle removal membrane device, and the pipe of the first microparticle removal membrane device is subsequently replaced with a sterilized microparticle removal membrane; and bypassing the second microparticle removal membrane device with a second bypass pipe; and passing water through the heat exchanger, the ultraviolet device, the ion-exchange device, and the first microparticle removal membrane device in order to produce ultrapure water.

9. The method for cleaning an ultrapure water production system according to claim 6, wherein the ultrapure water production system further includes a second microparticle removal membrane device disposed downstream of the first microparticle removal membrane device such that water is diverted from the second microparticle removal membrane device, and the method further comprises conducting any one of cleaning steps described in (III-1) to (III 3);

(III-1) after a first bypass pipe has been disposed such that the first microparticle removal membrane device is bypassed, the sterilization water or the flush water is fed into the first microparticle removal membrane device and discharged from a feedwater-side portion of the first microparticle removal membrane device to a concentrated-water-side portion of the first microparticle removal membrane device without permeating a microparticle removal membrane included in the first microparticle removal membrane device, and the remaining part of the sterilization water or the flush water is passed through the first bypass pipe and subsequently passed through the second microparticle removal membrane device, or (III-2) after a first bypass pipe has been disposed such that the first microparticle removal membrane device is bypassed, the sterilization water or the flush water is passed through the first bypass pipe and the second microparticle removal membrane device, and the microparticle removal membrane of the first microparticle removal membrane device is replaced with a sterilized microparticle removal membrane, or (III-3) after the microparticle removal membrane of the first microparticle removal membrane device has been replaced with a pipe, the sterilization water or the flush water is passed through the first and second microparticle removal membrane devices, and the pipe of the first microparticle removal membrane device is subsequently replaced with a sterilized microparticle removal membrane; and bypassing the second microparticle removal membrane device with a second bypass pipe; and passing water through the heat exchanger, the ultraviolet device, the ion-exchange device, and the first microparticle removal membrane device in order to produce ultrapure water.

10. The method for cleaning an ultrapure water production system according to claim 7, wherein a sterilized microparticle removal membrane is prepared by performing sterilization cleaning with one or more types of sterilization water selected from the group consisting of oxidizer-containing water, an organic solution, and hot water and subsequently replacing the sterilization water contained in the microparticle removal membrane with ultrapure water before the microparticle removal membrane is attached to the ultrapure water production system.

11. The method for cleaning an ultrapure water production system according to claim 10, wherein the microparticle removal membrane is attached to the ultrapure water production system within 6 months after the sterilization water contained in the microparticle removal membrane has been replaced with ultrapure water.

12. The method for cleaning an ultrapure water production system according to claim 7, wherein sterilization cleaning of the ultrapure water production system and flushing cleaning of the ultrapure water production system are performed by cleaning with one solution selected from the group consisting of alkali solution and acid solution.

* * * * *